(12) United States Patent
Xu et al.

(10) Patent No.: US 12,207,387 B2
(45) Date of Patent: Jan. 21, 2025

(54) FORCE NEUTRAL ADJUSTABLE PHASE UNDULATOR

(71) Applicant: UCHICAGO ARGONNE, LLC, Chicago, IL (US)

(72) Inventors: Joseph Z. Xu, Naperville, IL (US); Maofei Qian, Darien, IL (US); Alexander A. Zholents, Marina Del Rey, CA (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 274 days.

(21) Appl. No.: 17/891,769

(22) Filed: Aug. 19, 2022

(65) Prior Publication Data
US 2024/0064887 A1     Feb. 22, 2024

(51) Int. Cl.
*H05H 7/04*     (2006.01)
*H01S 3/0959*     (2006.01)
*H05H 13/04*     (2006.01)

(52) U.S. Cl.
CPC .............. *H05H 7/04* (2013.01); *H01S 3/0959* (2013.01); *H05H 13/04* (2013.01); *H05H 2007/041* (2013.01)

(58) Field of Classification Search
CPC .... H05H 7/04; H05H 13/04; H05H 2007/041; H01S 3/0959; H01S 3/0903
See application file for complete search history.

(56) References Cited

U.S. PATENT DOCUMENTS

| | | | | |
|---|---|---|---|---|
| 4,916,322 A | * | 4/1990 | Glavish ............... | G03F 7/70866 378/34 |
| 5,383,049 A | * | 1/1995 | Carr ......................... | H05H 7/00 359/283 |
| 6,858,998 B1 | * | 2/2005 | Shenoy .................. | H05H 13/04 315/501 |

(Continued)

OTHER PUBLICATIONS

Roger Carr, "Adjustable phase insertion devices as X-ray sources," Nuclear Instruments and Methods in Physics Research., Sect. A, vol. 306, p. 391-396, (1991).

(Continued)

*Primary Examiner* — Shawki S Ismail
*Assistant Examiner* — Lisa N Homza
(74) *Attorney, Agent, or Firm* — MARSHALL, GERSTEIN & BORUN LLP

(57) ABSTRACT

Employing undulator devices as x-ray radiation sources requires expensive and bulky support systems for operation, which are not robust and lead to limited ranges of generated radiation energies. A force-compensated undulator device is described. The device includes an undulator having first and second magnet arrays disposed along a central axis. The first magnet array is translatable along the central axis. The device further includes a compensator unit disposed adjacent to the first magnet array with the compensator unit having a first row of magnets disposed along a compensator axis with the compensator axis being parallel to the central axis, and a second row of magnets disposed along the compensator axis. The first row of magnets is translatable along the compensator axis. The compensator provides magnetic forces that neutralize the system dynamic magnetic forces generated by the undulator.

9 Claims, 18 Drawing Sheets

(56) References Cited

U.S. PATENT DOCUMENTS

| | | | |
|---|---|---|---|
| 7,196,601 B1* | 3/2007 | Gottschalk | H05H 7/04 |
| | | | 372/2 |
| 7,872,555 B2* | 1/2011 | Kitamura | H05G 2/00 |
| | | | 372/74 |
| 9,275,781 B2 | 3/2016 | Temnykh | |
| 9,355,767 B2 | 5/2016 | Gluskin et al. | |
| 2015/0255201 A1* | 9/2015 | Jeong | H01F 7/0221 |
| | | | 335/306 |
| 2016/0064129 A1* | 3/2016 | Gluskin | H01F 7/0221 |
| | | | 335/306 |
| 2017/0339777 A1* | 11/2017 | Kinjo | G21K 1/003 |

OTHER PUBLICATIONS

M. Borland, et al., "Tools for use of Generalized Gradient Expansions in Accelerator simulations," JACoW Publishing, IPAC 2021, MOPAB0592.

V. Sajaev, "Commissioning simulations for the Argonne Advanced Photon Source upgrade lattice," Physical Review Accelerators and Beams, vol. 22, 040102, (2019).

\* cited by examiner

| Op. Mode | Jaw 1 | Jaw 2 | Jaw 3 | Jaw 4 |
|---|---|---|---|---|
| V. Lin. | 0 | 0 | 0 | 0 |
| 1/4 pi | 0 | 0 | 0.25 | 0.25 |
| 1/2 pi | 0 | 0 | 0.5 | 0.5 |
| 3/4 pi | 0 | 0 | 0.75 | 0.75 |
| 1 pi | 0 | 0 | 1 | 1 |
| Right Cir. | 0.5 | 0 | 0.5 | 0 |
| -1/4 pi | 0.5 | 0 | 0.25 | -0.25 |
| -1/2 pi | 0.5 | 0 | 0 | -0.5 |
| -3/4 pi | 0.5 | 0 | -0.25 | -0.75 |
| -1 pi | 0.5 | 0 | -0.5 | -1 |
| H. Lin. | 1 | 0 | 1 | 0 |
| -1/4 pi | 1 | 0 | 0.75 | -0.25 |
| -1/2 pi | 1 | 0 | 0.5 | -0.5 |
| -3/4 pi | 1 | 0 | 0.25 | -0.75 |
| -1 pi | 1 | 0 | 0 | -1 |
| Left Cir. | 0.5 | 0 | -0.5 | 0 |
| 1/4 pi | 0.5 | 0 | -0.25 | 0.25 |
| 1/2 pi | 0.5 | 0 | 0 | 0.5 |
| 3/4 pi | 0.5 | 0 | 0.25 | 0.75 |
| 1 pi | 0.5 | 0 | 0.5 | 1 |

FIG. 11

FORCE NEUTRAL ADJUSTABLE PHASE UNDULATOR

STATEMENT REGARDING FEDERALLY SPONSORED RESEARCH OR DEVELOPMENT

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to radiation sources, and in particular, to undulator radiation sources.

BACKGROUND

In contemporary high brightness synchrotron and free electron laser (FEL) radiation sources, undulators serve as the primary source of radiation. Undulators provide high brightness radiation beams with narrow spectral peaks, reducing unnecessary or unwanted spectral content and increasing the efficiency of the device for multiple applications. Undulators, as parts of storage ring-based synchrotrons light sources or FELs, can be configured to generate radiation across a broad range of wavelengths or energies, for example, x-ray radiation with wavelengths near 0.1 nanometers, radiation in the far-infrared range from 400 to 1000 microns, or radiation having energies of 100 keV and higher at wavelengths 0.015 nm and shorter. Another feature of undulator radiation is its high collimation and coherence, and, as a result, the ability to focus x-ray beams on very small probes. There are two types of permanent magnet undulators, a planar undulator produces light with a linear polarization at many harmonics of a fundamental frequency of the undulator radiation, and a helical undulator design operates mainly at the fundamental frequency of the undulator radiation and produces light with circular polarization. Elliptically polarized light can also be obtained with variations to the undulator design. The potential for single spectral mode operation of undulators, along with the ability to create devices operating at a broad range of energies, makes undulator technologies highly attractive for a multitude of unique experiments and technological applications. For example, undulator devices provide radiation that is useful for medical imaging, biomedical applications, polarization modulation spectroscopy, optical engineering, solid state physics, biology, and metrology, among other applications.

An undulator is a magnetic device that consists of a periodic arrangement of magnets or magnetic fields. FIG. 1 illustrates a typical embodiment of an undulator device 100. An electron 102 with an initial injection path 104 is injected into the undulator device 100 with a first row of magnets 106a-j and a second row of magnets 107a-j that is apart from and opposes the first row of magnets 106a-j. The two rows of magnets 106a-j and 107a-j induce magnetic fields between them. The first set of magnets 106a and 107a with upward pointing arrows denote magnets configured to create a magnetic field with field lines going up in the plane of the page between the first set of magnets 106a and 107a, while magnets with downward pointing arrows, such as the second set of magnets 106b and 107b in each row, denote magnets configured to create a magnetic field with field lines going down in the plane of the page between the second set of magnets 106b and 107b. Magnetic fields exist between each set of magnets in FIG. 1 with fields going up or down corresponding to the respective up and down arrows on the magnets.

As the electron 102 moves into the first magnetic field between the first set of magnets 106a and 107a, the magnetic field induces a change in the direction of the trajectory of the electron 102 causing the electron 102 to move into the plane of the page in a direction orthogonal to the direction of the magnetic field lines. Once the electron 102 has moved out of the first magnetic field between the first set of magnets 106a and 107a into the second magnetic field between the second set of magnets 106b and 107b the magnetic field is reversed, or in an opposite direction, to the first magnetic field between the first set of magnets 106a and 107a. Therefore, the second magnetic field between the second set of magnets 106b and 107b causes the trajectory of the electron 102 to move in a direction opposite to that of the induced trajectory change due to the first magnetic field between magnets 106a and 107a. As the electron 102 travels from one magnetic field to the next through the undulator device 100, the periodic reversing or switching of the magnetic field direction causes the trajectory of the electron 102 to oscillate or undulate as illustrated by the oscillatory trajectory 110 shown in FIG. 1. By changing the direction or the trajectory of the electron 102, the periodic magnetic field forms the electron trajectory in an oscillatory pattern. As a result, the electron 102 emits electromagnetic radiation 112 along axis A, defined by the electron's oscillatory trajectory. The wavelength, polarization, and intensity of the emitted electromagnetic radiation 112 depend on the strength of the magnets, the period of the magnetic field oscillation, the energy (i.e., speed) of the electrons, the charge or total number of electrons, the length of the undulator, a distance 120 between the first and second rows of magnets 106a-j and 107a-j, and the direction and pattern of the periodic magnetic fields, among other factors. In some undulators, the distance 120 between the first and second rows of magnets 106a-j and 107a-j may be tunable to change the energy of the emitted electromagnetic radiation 112. In fact, characteristics of the emitted electromagnetic radiation may be tunable, for example the wavelength of the emitted electromagnetic radiation may be tuned by controlling the energy of the electrons.

The electron 102 may be one of multiple electrons in an electron beam. The intensity of the emitted electromagnetic radiation 112 is dependent on the number of electrons in an electron beam passing through the undulator device 100. For major parts of the spectrum, the radiation emitted from different electrons 102 in an electron beam passing through the undulator device 100 is incoherent due to random locations of the electrons 102 in space and time. Under special conditions, applied to the electron beam, and with a long enough undulator, the interaction of the emitted electromagnetic radiation 112 with the electrons 102 in the electron beam could cause the electrons 102 to clump into microbunches, each microbunch separated from adjacent microbunches by one wavelength of the emitted electromagnetic radiation 112. The microbunches, each positioned one wavelength from an adjacent microbunch, oscillate in phase with each other. As the intensity of the emitted electromagnetic radiation 112 increases further, the electrons are further clumped into microbunches with higher concentrations of electrons 102. The microbunches of electrons oscillating in phase with each other emit electromagnetic radiation 112 that is in phase, and allows for an overall increase, by many orders of magnitude, in the intensity of the emitted electromagnetic radiation 112.

Increasing the length of the undulator magnet can increase the total intensity of emitted radiation. Although, increasing the undulator length may contribute to other technical issues and considerations such as complicating magnet alignment and structural straightness, necessitating more stringent mechanical requirements, complicating coherence issues and tolerances, requiring more complex cryogenic cooling modules with greater cooling capacity, integrated electron beam focusing, and structural issues due to very strict straightness requirements.

Undulators are also known as Insertion Devices (IDs). The majority of synchrotron radiation sources, including FELs, utilize undulators with a vertically oriented magnetic field. This preferential direction is the result of the strong asymmetry; the horizontal size of the electron beam cross-section in synchrotron storage rings is typically much larger than the vertical cross-section. Additionally, current long undulators, on the order of meters in length, require extremely large bulky structures to support the straightness of the undulator. These large structures require space in the direction of the undulator design. As such, a horizontal undulator requires much more square footage of floor space as compared to a vertically stacked structure of a vertical undulator. Therefore, vertical gap undulators have been a main source of synchrotron radiation in synchrotron sources. FELs and newer generation synchrotrons have symmetric circular electron beam cross-section. Horizontally oriented undulators may provide radiation having desired polarizations for certain implementations. As such, undulators may provide radiation of various polarizations according to the needs and limitations of specific systems and experiments.

Horizontally oriented undulators provide radiation having a polarization rotated by 90° as compared to vertically oriented undulators. The rotated polarization of the radiation allows for providing radiation to x-ray beamline setups that are gravity neutral which may be required for any number of applications. Additionally, in many systems, a horizontally oriented undulator allows for significant simplifications in the construction and operation of such a setup. For example, for gravity neutral horizontal setups, structural and motor components for controlling positions of x-ray beamline optical components, experiment samples and detectors are greatly simplified allowing for more compact designs.

Modern synchrotron and FEL facilities require high precision long undulators to generate desired intensities of radiation. Typically, long undulators are physically supported by large, heavy, and bulky mechanical supporting structures. Even with such support structures, it is still very difficult to achieve sub-microinch level precision alignment of undulator segments and magnets, which is required to generate high-intensity radiation. Additionally, tuning the gap distance 120 between magnets for adjusting the radiation energy further requires very high precision again requiring extremely bulky and heavy components. Due to the strength of the magnets used in undulators, there is a minimum distance for the gap between magnets which limits the bandwidth of generated radiation. Further, the strength of magnetic fields generated by the magnets can cause deformation and buckling of undulator components of the support structure, which renders undulator systems useless.

As described above, the strong magnets used in high-intensity radiation undulator sources makes adjusting of magnet gaps very difficult in three to five meter long undulator devices. As such, current undulator systems with adjustable gap require massive support structures which are extremely heavy and expensive due to the size, weight, and precision of the structure. Additionally, custom machining devices are typically required to build such large support beams and structures. Due to the drawbacks of current undulator systems, improved designs are desirable to provide for more precise, compact, lightweight, less expensive, and more robust undulator devices.

SUMMARY OF THE DISCLOSURE

In an embodiment, disclosed is a force-compensated undulator device comprising including a first magnet array disposed along a central axis of the undulator device, the first magnet array being translatable along the dimension of the central axis. A second magnet array is disposed along the central axis, the second magnet array disposed on an opposite side of the central axis from the first magnet array with a fixed gap distance separating the second magnet array from the first magnet array. A force-compensator unit is disposed adjacent to the first magnet array, the compensator unit including (i) a first row of magnets disposed along a compensator axis, the compensator axis being parallel to the central axis, and (ii) a second row of magnets disposed along the compensator axis on an opposite side of the compensator axis from the first row of magnets, and the first row of magnets is translatable along the dimension of the compensator axis.

In a variation of the current embodiment, the first row of magnets is mechanically coupled to the first magnet array and the position of the first row of magnets tracks with the position of the first magnet array. In another variation, compensator unit provides a magnetic force in opposition to a magnetic force provided by the first and second magnet arrays, resulting in a net magnetic force between the first and second magnet arrays to be neutralized in a given dimension. In more variations of the current embodiment, a single actuator is mechanically coupled to the first magnet array, the actuator configured to control the position and movement of the first magnet array.

In variations of the current embodiment, the undulator device is an adjustable phase undulator. In some embodiments, the gap profile is maintained within less than a 10 micron tolerance. The gap profile, along the length of the undulator is maintained within +/−10 microns in order to reach the a root-mean-square (RMS) phase error of less than 3 degrees per 3 meter long undulator at k>=1. The average gap repeatability for the force-compensated undulator described herein, that defines the energy of the radiation, is maintained within less than 1 micron.

In another embodiment, disclosed is a method for performing force compensation of magnetic forces for an undulator. The method includes providing an undulator having a first magnet array and a second magnet array. The first magnet array and second magnet array are disposed along a central axis on opposite sides of the central axis with the second magnet array disposed at a gap distance away from the first magnet array. The first magnet array is translatable along the dimension of the central axis. The method further includes providing a compensator unit disposed adjacent to the first magnet array. The compensator unit includes (i) a first row of magnets disposed along a compensator axis, the compensator axis being parallel to the central axis, and (ii) a second row of magnets disposed along the compensator axis on an opposite side of the compensator axis from the first row of magnets. The first row of magnets is translatable along the dimension of the compensator axis.

Further, the method includes moving the first row of magnets in according to the motion and position of the first magnet array.

In a variation of the current embodiment, the first row of magnets is mechanically coupled to the first magnet array, and controlling the position of the first row of magnets comprises causing the position of the first row of magnets to track with the position of the first magnet array. In more variations of the current embodiment, first magnet array has a magnet period, and wherein the first magnet array is translatable by a distance equal to half of the magnet period. In yet more variations, the compensator unit provides a magnetic force in opposition to a magnetic force provided by the first and second magnet arrays, resulting in a net magnetic force between the first and second magnet arrays to be negligible in a given dimension.

In another variation, the first magnet array is translatable by controlling a position and movement of the first magnet array by a single actuator. In variations, the undulator is an adjustable phase undulator.

BRIEF DESCRIPTION OF THE DRAWINGS

FIG. 11 is a table of different position configurations of magnet arrays of an X-undulator for generating different polarizations of radiation

DETAILED DESCRIPTION

Magnetic undulator devices are used to provide radiation for a multitude of purposes. For example, high-energy radiation such as x-ray radiation provided by undulators may be used for controlling, measuring, and observing chemical, material, and biological processes that may occur on the attosecond to millisecond time scale. Further, radiation may be used to probe materials at lengths of picometer and nanometer scales. Conventional tunable magnetic undulators typically have an adjustable gap separation mechanism for tuning the energy of generated radiation. The distance between the magnets, otherwise referred to as the profile of the gap between the magnets, must be controlled and maintained within less than a 10-micron tolerance of precision for proper operation of an adjustable undulator. The forces between magnets of a tunable undulator may vary by many metric tons, therefore, extremely bulky and heavy support systems are required to maintain positions of the magnets against the resultant forces between the magnetic structures. The structures required for such systems are not robust in that they must be custom designed for a given system, and are extremely large, bulky, and expensive. Further, long undulators, with separate undulator segments on the order of meters in length, require phase correctors, kickers, and other magnetic and electrical components to guide charged beams of particles due to the extreme magnetic and mechanical forces.

Disclosed is a force neutral adjustable phase undulator device that uses compensation magnets to neutralize the magnetic forces provided to support structures and elements. As compared to other undulators, the disclosed system allows for the fabrication of more precise, compact, less expensive, and simpler device design of high precision long undulators on the order of meters in length and can maintain a magnet gap profile tolerance of 20 microns or less, and in instances, of 10 microns or less. By reducing the physical and mechanical stresses due to the compensation of magnetic field forces, the required structural supports may be less bulky and less heavy which further allows for the use of less expensive materials. Additionally, the reduced mechanical stresses allows for the use of smaller or less powerful motors for controlling positions of magnets and structures of the undulator. The disclosed magnetic force neutralizing elements may be applied to planar, helical, and X-undulators producing radiation with variable polarizations in either vertical or horizontal orientations in beam lines. Additionally, while permanent magnets are described, the disclose force compensated undulator may include one or more electrical or even superconducting magnets. The disclosed system may also be useful for fabrication of a compact multiplexed force neutral undulator system.

Figure 2A:
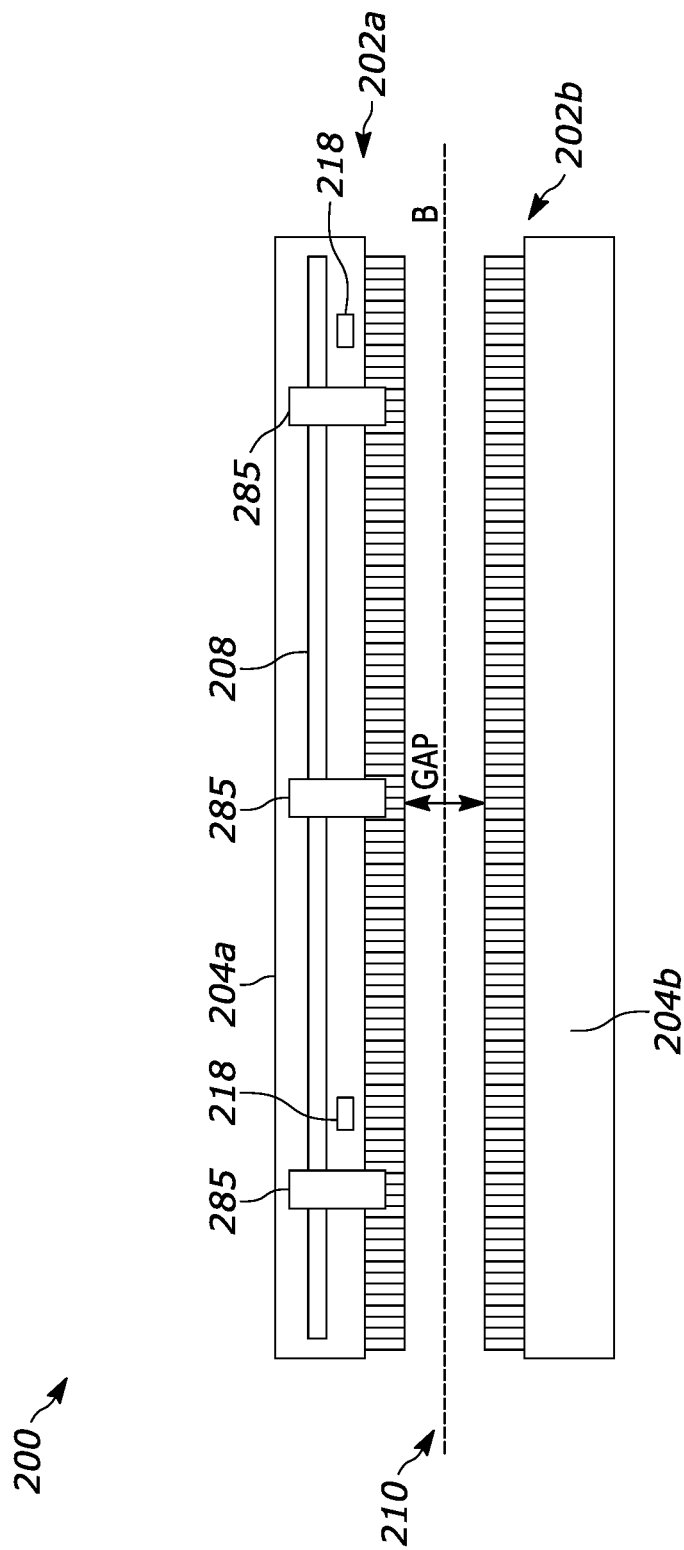
FIG. 2A is a side view of a block diagram of a force neutral undulator system.
Figure 2B:
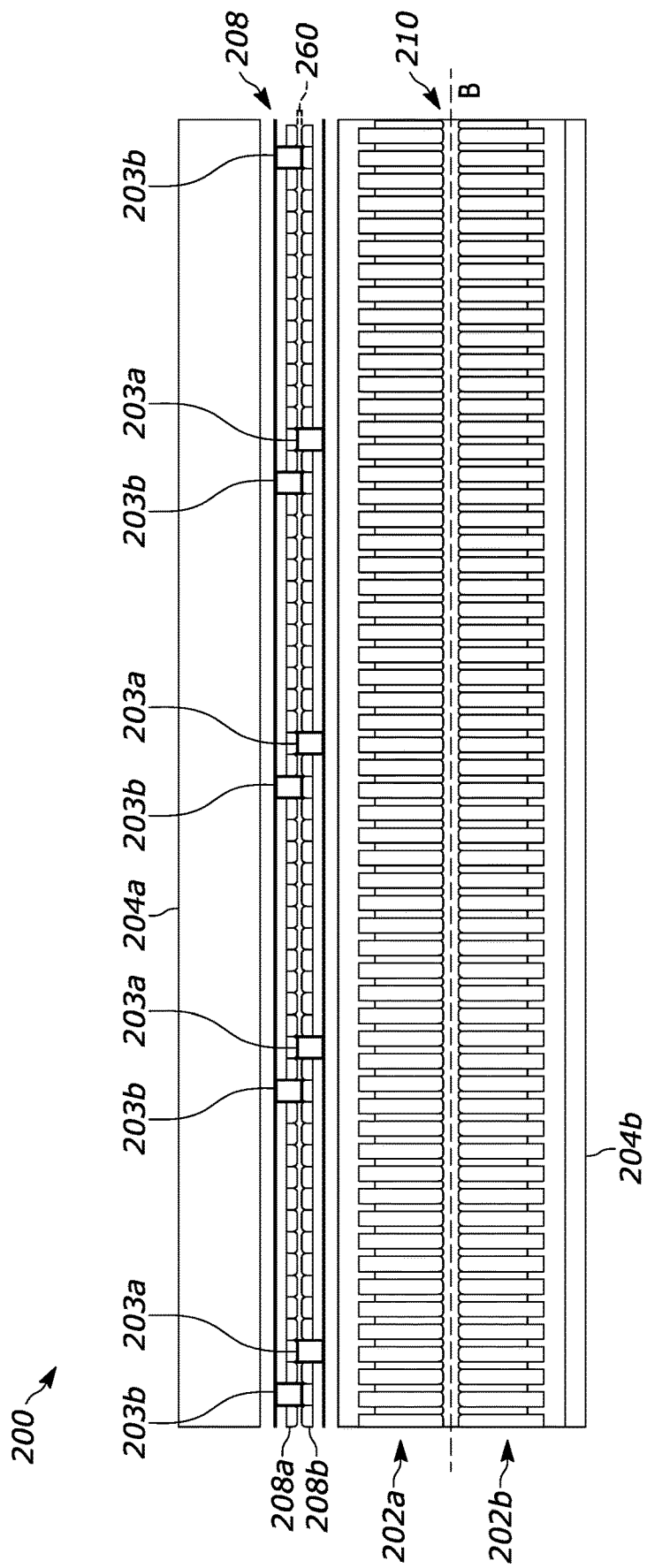
FIG. 2B is a cross-sectional side view of the force neutral undulator of FIG. 2A.

FIG. 2A is a side view of a block diagram of a force neutral undulator 200, and FIG. 2B is a cross-sectional side view of the force-neutral undulator for FIG. 2A, according to embodiments disclosed herein. In examples, the undulator 200 will be described in reference to an adjustable phase undulator (APU).

The undulator 200 includes a first magnet array 202a and a second magnet array 202b disposed across from, and opposing, the first magnet array 202a. The first and second magnet arrays 202a and 202b are disposed along a central axis B along which a beam of charged particles (e.g., electrons) may propagate. The first and second magnet arrays 202a and 202b provide attracting magnetic forces to each other with the strength of the magnetic forces being dependent on the magnetic strength of magnets of the magnet arrays 202a and 202b, and a gap 210 between the first and second magnet arrays 202a and 202b. Each of the first and second magnet arrays 202a and 202b is physically coupled to, and supported by, respective first and second keepers 204a and 204b. Each of the keepers 204a and 204b is a structure for mounting and maintaining a position of each of the magnet arrays 202a and 202b. The keepers 204a and 204b may be configured to be shiftable to alter the gap 210 between the magnet arrays 202a and 202b.

A force compensation unit 208 is disposed adjacent to the first magnet array 202a. The compensation unit 208 includes a plurality of magnets that neutralize the magnetic forces that the first and second magnet arrays 202a and 202b provide to each other and system components such as the keepers 204a and 204b. The force compensation unit 208 includes a first row of magnets 208a and a second row of magnets 208b disposed across from the first row of magnets 208a across a gap 260. As described in further detail herein, the force between the first and second rows of magnets 208a and 208b neutralizes the net magnetic forces on the mechanical structures of the system.

The first row of magnets 208a is physically coupled to the first magnet array 202a by first mounting beams 203a such that the first row of magnets 208a translates along with the first magnet array 202a during operation of the APU 200. Additionally, second mounting beams 203b physically couple the second row of magnets 208b to the second magnet array 202b via the system support frame 290 and the keeper 204b that is rigidly connected with the supporting beams to maintain the position of the second row of magnets 208b relative to the second magnet array 202b, which will be discussed in further detail with reference to FIGS. 7A and 7B. The mechanical features of an operation of the compensation unit will be further described herein with reference to FIGS. 5A-5C, 7A, and 7B. While described as being adjacent to the first magnet array 202a, the compensation unit 208 may be adjacent to the second magnet array 202b. Additionally, the undulator 200 may employ two compensation units 208 with each compensation unit 208 being adjacent to a corresponding one of the first and second magnet arrays 202a and 202b. Examples of the compensation unit 208 are further described in detail with reference to FIGS. 5A-5C, and 7A-7B.

The undulator 200 further includes one or more linear slides 285 that are mechanical slides that support movement of the first keeper 204a, first magnet array 202a, and the first row of magnets 208a of the compensation unit 208 horizontally in the plane of the page along a longitudinal direction of the central axis B. The linear slides 285 may include one or more motors, actuators, or other mechanical devices or elements for tuning the position of the first magnet array 202a, first keeper 204a, and the first row of magnets 208a of the compensation unit 208. The encoders 218 provide a measurement of the distance of movement of the first magnet array 202a in reference to the second magnet array 202b and associated components. The encoders 218 may include one or more of a linear optical encoder, a Hall Effect encoder, a magnetoresistive coder, a linear encoder, a rotary encoder, or another type of encoder or sensor for determining the position and translational distances of any of the described movable components (e.g., magnet arrays 202a and 202b, keepers 204a and 204b, the first and second rows of magnets 208a and 208b of the compensation unit 208, etc.). Changing the horizontal position of the first magnet array 202a relative to the stationary position of the second magnet array 202b allows for tuning of the phase of the undulator 200, as will be further described herein.

Figure 3:
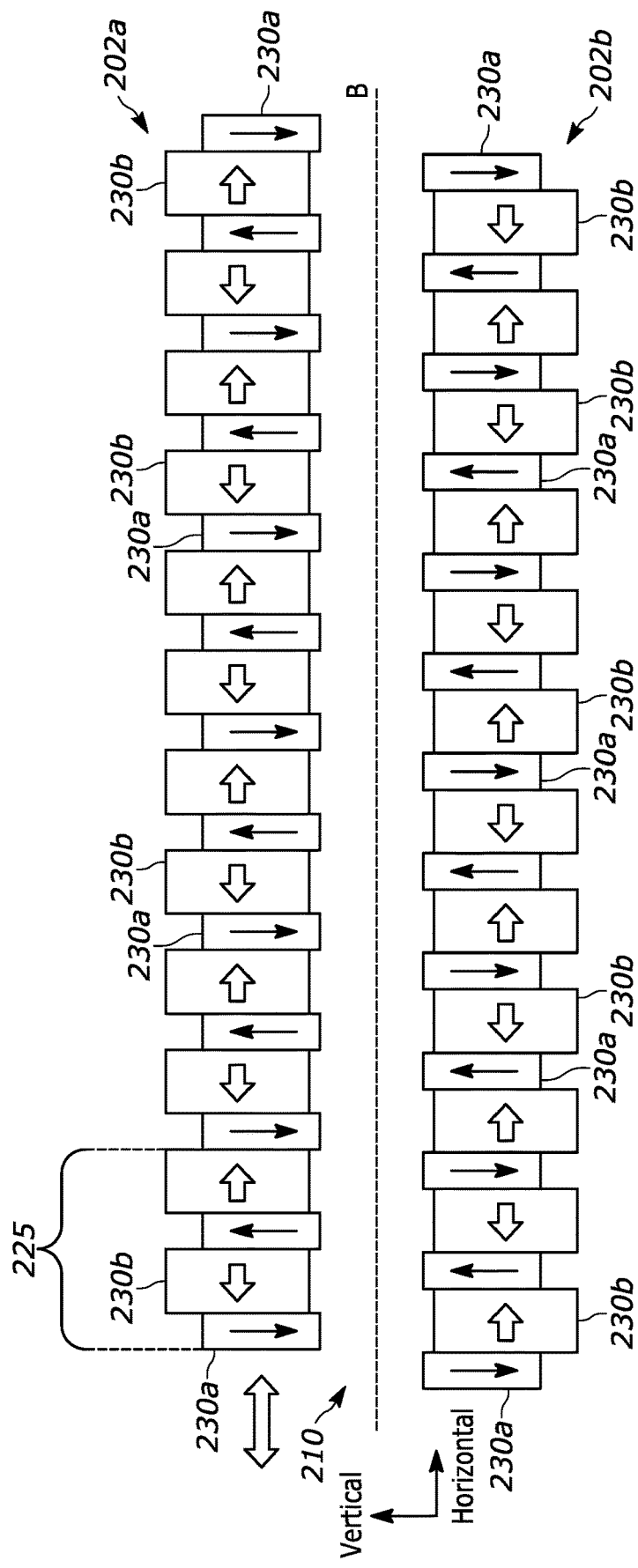
FIG. 3 is a close up side view diagram of magnet arrays as implemented in an adjustable phase undulator (APU) device.

FIG. 3 is a close-up side view diagram of the first and second magnet arrays 202a and 202b as implemented in an APU device. While described herein as magnets, some of the elements of the magnet arrays may include high magnetic materials that are not magnets themselves. For example, some of the magnets of the magnet arrays 202a and 202b may be iron which is a high magnetic material that allows for higher magnetic flux through the iron material. As such, the magnets of the magnet arrays 202a and 202b will be simultaneously referred to as magnets and poles as the magnet arrays 202a and 202b may include both permanent magnets, and high magnetic materials commonly referred to as "poles." Arrows on the poles and magnets of the magnet arrays 202a and 202b indicate the magnetization orientation. Each vertical pole 230a has a magnetic direction that is up or down in the plane of the page, while each of the horizontal magnets 230b has a magnetic direction that is left or right in the plane of the page, as indicated by corresponding arrows on each pole and magnet. In an implementation, the vertical poles 230a were iron blocks, while the horizontal magnets 230b were permanent magnets. It should be understood that various poles or magnets may be used for any of the elements of the first and second magnet arrays 202a and 202b. FIG. 3 further illustrates a magnet period 225 of the first magnet array 202a. The magnet period 225 is a length along the central axis B over which four magnets (or two magnets and two poles), one of each polarity direction, of the first magnet array 202a are traversed by an electron beam propagating along the central axis B. While not illustrated, the second magnet array 202b also has a period according to the same definition. Each of the magnet arrays 202a and 202b includes multiple periods 225 of magnets along the central axis B to form the length of the undulator 200. The magnetic period 225 may also be referred to herein as the period 225 of the undulator 200.

Figure 1:
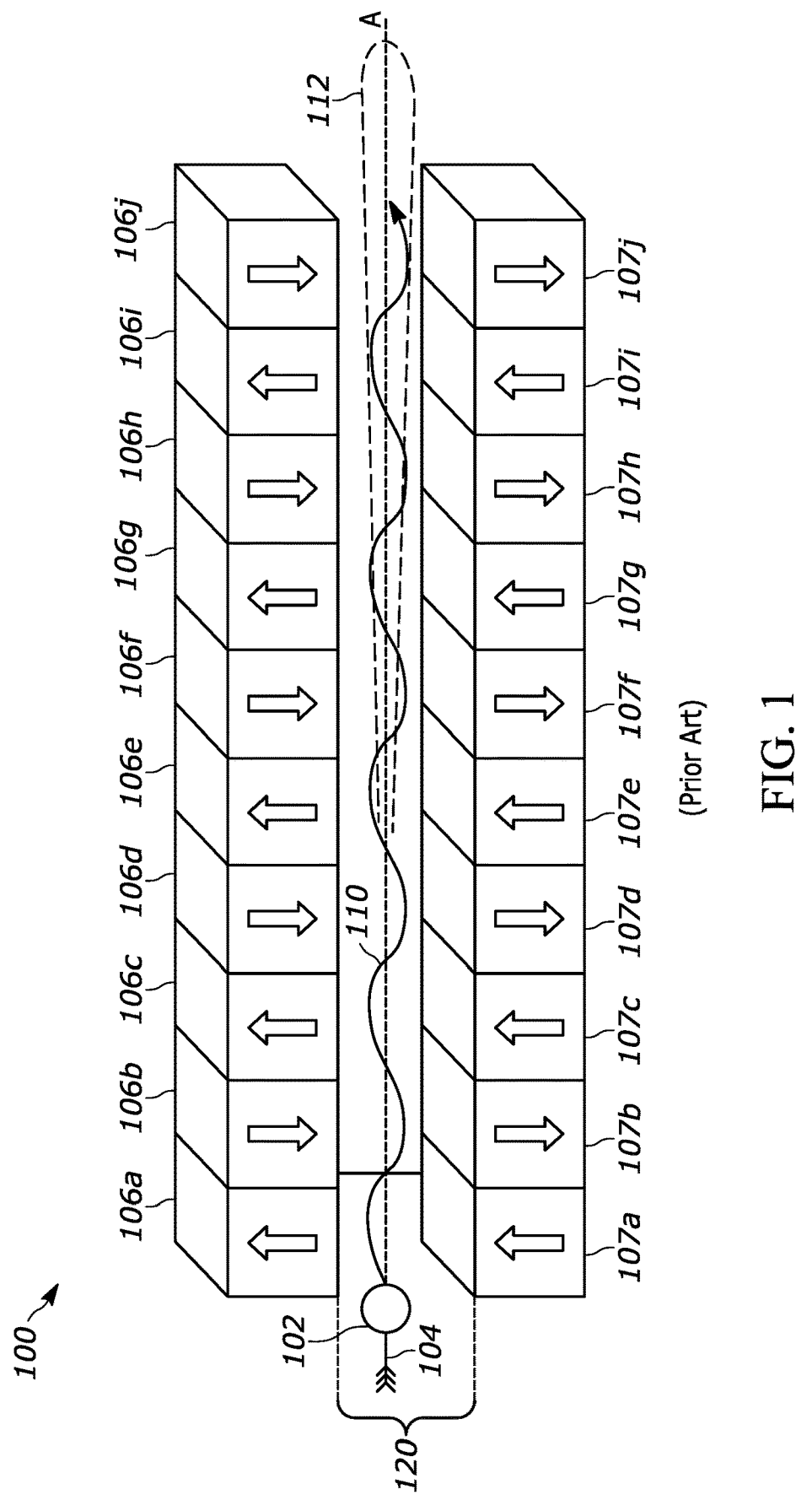
FIG. 1 illustrates a prior art embodiment of an undulator device.

As illustrated in FIG. 1. an undulator typically maintains the magnets in positions with two up-poled magnets (i.e. "up magnets") disposed across the gap 210 from each other, and two down-poled magnets (i.e. "down magnets") disposed across the gap 210 from each other. In such an arrangement each left magnet is across from a right poled magnet, and each right magnet across from a corresponding left poled magnet. Therefore, a charged particle passing between the first and second magnet arrays 202a and 202b experiences forces into, and out of, the plane of the page forces causing undulations orthogonal to the plane of the page. As shown in FIG. 3, undulators typically include left and right poled magnets as well. The left and right poled magnets enhance the magnetic field between the first and second magnet arrays 202a and 202b by shaping the magnetic field to be more uniformly up and down between the magnet arrays 202a and 202b. This enhancement increases the tuning range of radiation wavelengths generated by the undulator. Such an arrangement of positions of corresponding pairs of up magnets and pairs of down magnets is referred to as an "in-phase" position, "in-phase" configuration, "paired" configuration or when the first and second magnet arrays 202a and 202b are "in-phase," resulting in the maximum undulation amplitude of charged particles propagating along the central axis B.

The undulator 200 may be effectively turned "out-of-phase by half period" when each of the vertical magnets 230a is paired with an oppositely poled magnet (i.e., each up magnet is across the gap 210 from a down magnet, and vice versa). The "half-period" configuration may also be referred to as a "half-period" position, or when the magnet arrays 202a and 202b are "out-of-phase" or "unpaired." In such a configuration, charged particles propagating along the central axis B will not experience any vertical forces and therefore not undulate resulting in no generation of radiation. The distance shift of the first magnet array 202a from the in-phase position to the half period out-of-phase position is half of the period 225 of the undulator 200. Positions of the first magnet array 202a between the in-phase position, and the half-period position result in radiation with varied phases which enables control of a transverse magnetic field intensity that in turn adjusts the energy of the radiation. In examples, the first magnet array 202a may be translatable by a quarter of the period 225, by half of the period 225, by a whole period 225, or by a distance equal to or greater than half of the period 225.

Figure 4:
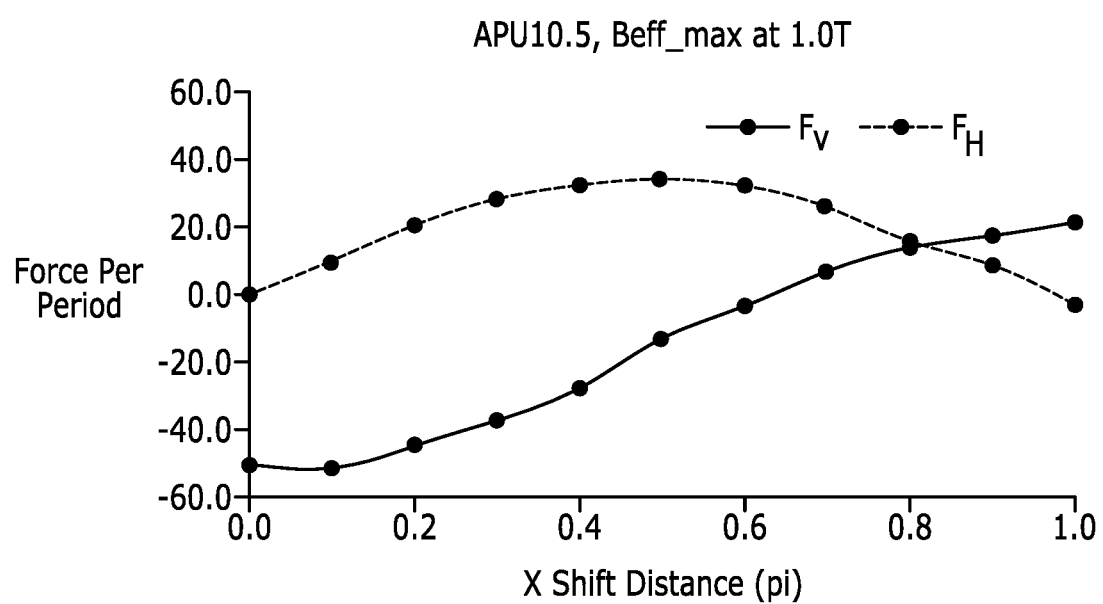
FIG. 4 is a plot of force per period versus periodic distance shift of an APU magnet array as measured by fractions of pi in phase (i.e., one period equals 2 pi).

Due to the various tunable positions and the movement of the first magnet array 202a along the central axis B, extremely large dynamic magnetic forces in the vertical (i.e., transverse) and horizontal (i.e., longitudinal) directions are present on each of the first and second magnet arrays 202a and 202b which causes structural issues and potential failure for APU devices. FIG. 4 is a plot of force per period versus distance shift of the first magnet array 202a as measured by fractions of the period 225 in terms of π, with a period being equal to 2π. The data of FIG. 4 is reported for a three-meter-long APU having a 10.5 mm period and a gap of 3.0 mm between the two magnet arrays. The total distance shift of the first magnet array reported in FIG. 4 is half of the period 225 (i.e., a phase distance of π). The APU experiences greater than a metric ton of force in the horizontal direction along the central axis B, and over two metric tons of force in the vertical direction with each of the experienced forces varying with the position of the first magnet array 202a.

These dynamic magnetic forces increase with increased undulator length, and therefore, the strength of these forces often limits the overall lengths of fabricated undulators which further limits the ranges of radiation intensities. The extremely large dynamic forces also may limit the size of the gap 210 distances of devices, which even further limits the intensities and energy ranges of generated radiation. With fixed gap configuration, an APU can tolerate much larger force in the vertical direction. However, the force in the longitudinal direction accumulates with the increase of the undulator length which typically limits the length of the undulator. The disclosed force neutral undulator reduces and neutralizes the magnetic forces experienced by mechanical components of the undulator 200 in both vertical and horizontal directions by including the compensation unit 208 to mitigate magnetic forces allowing for broader ranges of radiation energies and intensities, and the fabrication of more precise, simpler, lighter weight, more compact, and less expensive undulators.

Figure 5A:
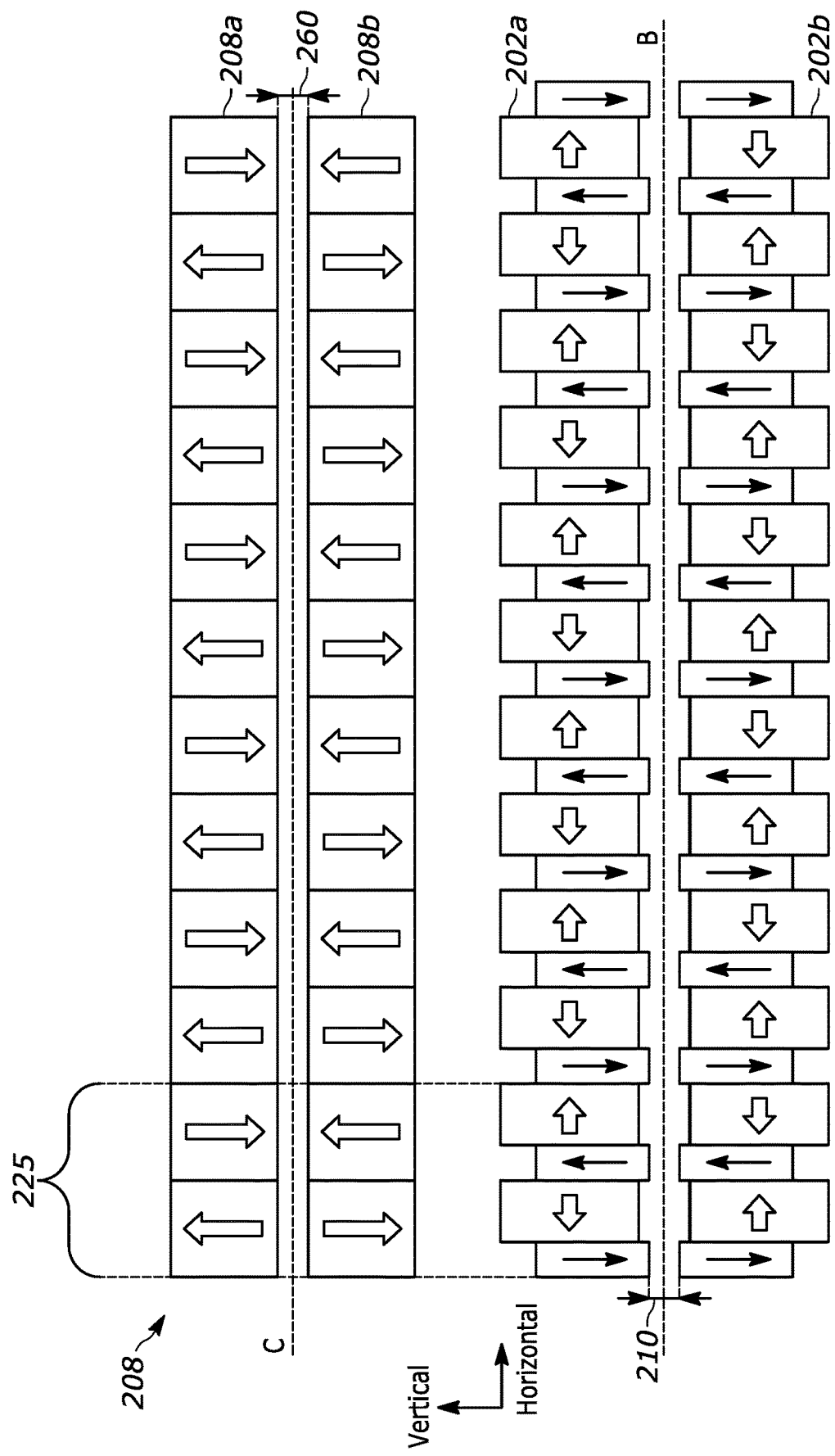
FIG. 5A is a side view diagram of APU magnet arrays and compensation unit magnets in an in-phase configuration.
Figure 5B:
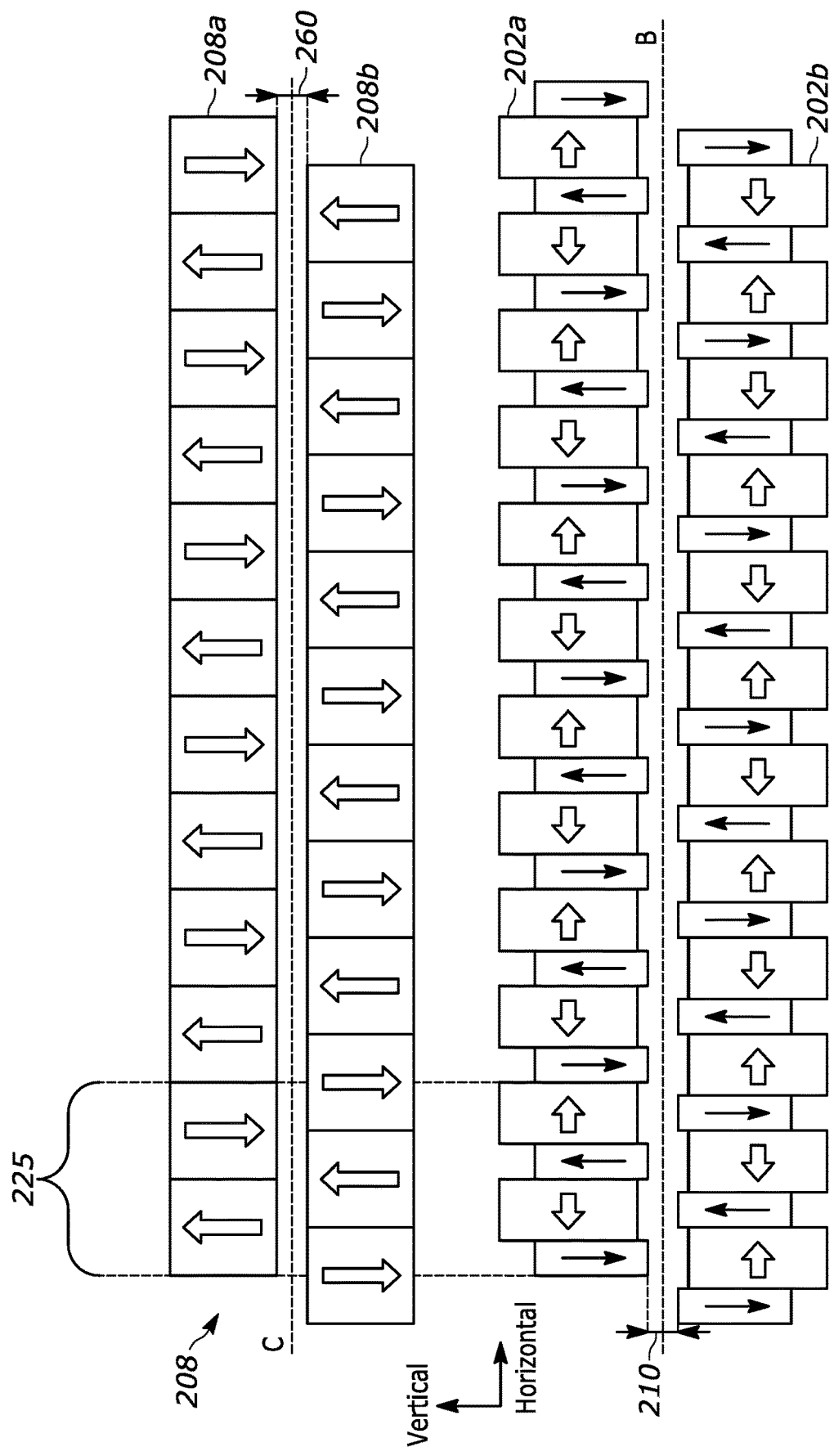
FIG. 5B is a side view diagram of APU magnet arrays and compensation unit magnets in a partially out-of-phase (pi/2) configuration.
Figure 5C:
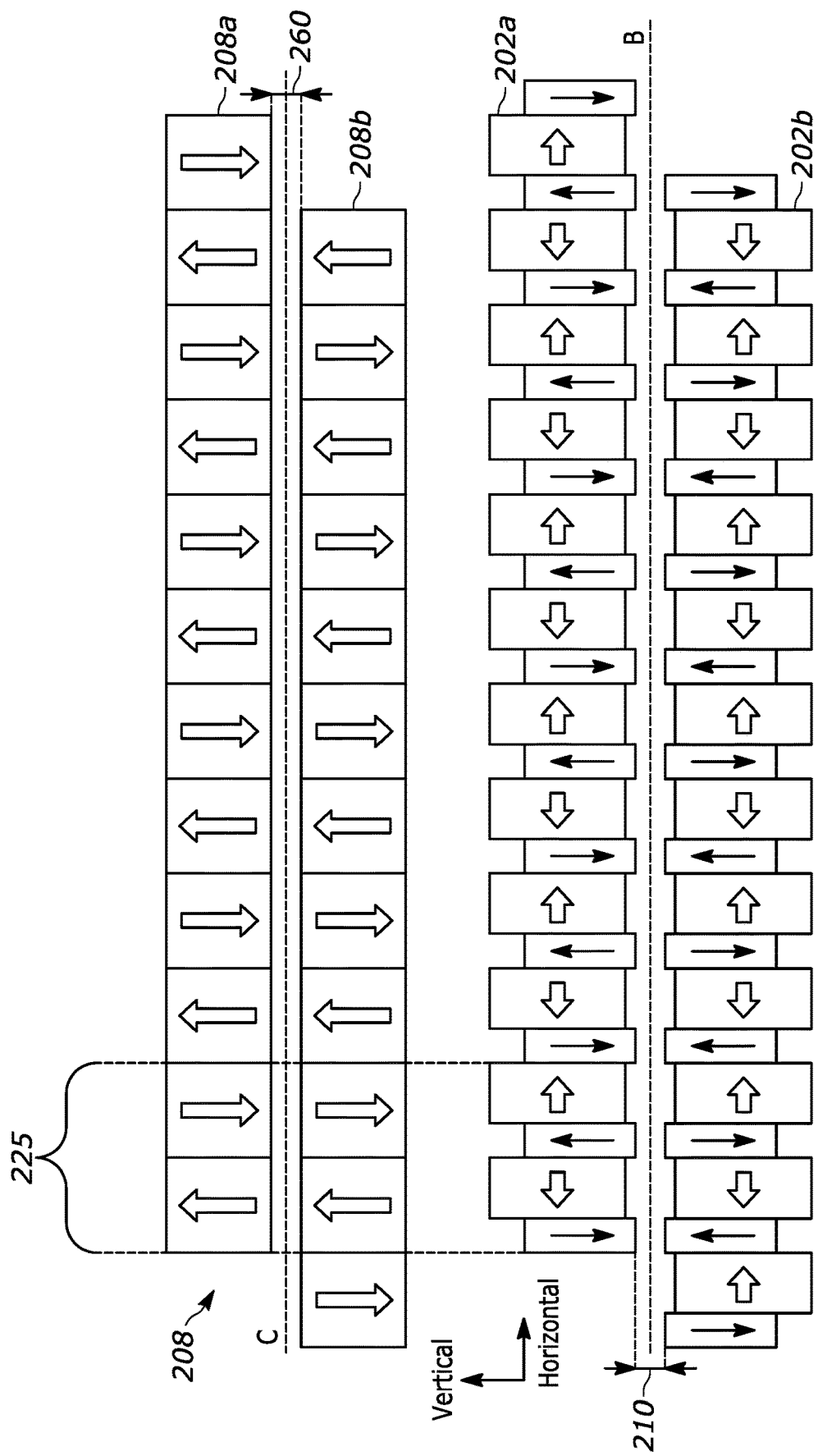
FIG. 5C is a side view diagram of APU magnet arrays and compensation unit magnets in an out-of-phase (pi) configuration.

FIGS. 5A-5C are side view diagrams of the first and second magnet arrays 202a and 202b with the compensation unit 208 in in-phase, quarter period out-of-phase (i.e., π/2), and half period out-of-phase (π) configurations respectively. The compensation unit 208 includes the first and second rows of magnets 208a and 208b. The second row of magnets 208b is disposed adjacent to the first magnet array 202a. The first and second rows of magnets 208a and 208b are disposed along a compensator axis C, and the first row of magnets 208a may be translated along the compensator axis C. The first and second rows of magnets 208a and 208b are disposed opposite each other on either side of the compensator axis C with a compensator gap 260 between the first and second rows of magnets 208a and 208b. Similar to the magnets of the first and second magnet arrays 202a and 202b, magnetic moments of magnets of the first and second rows of magnets 208a and 208b are illustrated by arrows on the magnets. The magnets of the first and second rows of magnets 208a and 208b are disposed in positions such that the magnetic forces between the first and second rows of magnets 208a and 208b cancels components of the magnetic forces generated by the first and second magnet arrays 202a and 202b. Specifically, the force generated by the first and second rows of magnets 208a and 208b reduces, or completely neutralizes, the dynamic forces generated by the first and second magnet arrays 202a and 202b in the vertical and horizontal directions in the plane of the page. It should be understood that the compensation unit 208 does not neutralize or reduce the vertical magnetic force in the gap 210 that is provided to charged particles in the gap 210. The forces provided by the compensator unit 208 provide opposing vertical and horizontal magnetic forces to the forces on each of the first and second magnet arrays 202a and 202b. This force compensation further reduces the net forces on the structures of the undulator 200, and neutralizes dynamic mechanical forces on any adjustable mechanical elements of the system.

In the illustrated examples, the first and second rows of magnets 208a and 208b employ only vertically polarized magnets. In other examples, additional magnets having poles in any direction may be used for canceling or reducing magnetic forces of the system. The first and second rows of magnets 208a and 208b have a magnetic period 225 equal to the magnetic period 225 of the first and second magnet arrays 202a and 202b. The magnetic period 225 of the first and second rows of magnets 208a and 208b may also be referred to as the "compensator period" or "period of the compensator." The periods of the compensator 208 and the undulator 200 must be equivalent for the magnetic force vectors to align properly and to effectively neutralize the dynamic magnetic forces generated by the first and second magnet arrays 202a and 202b on mechanical structures of the system (e.g., magnet arrays, keepers, mechanical support structures, etc.).

The compensator gap 260 may be a smaller distance than the gap 210 between the first and second magnet arrays 202a and 202b. The gap 210 of the first and second magnet arrays 202a and 202b has a minimum distance that is determined by vacuum chamber components disposed in the gap 210. No components are necessarily disposed in the compensator gap 260, and therefore the compensator gap 260 can be as arbitrarily small as desired. The magnetic force generated between magnets is proportional to the field density squared, $F \propto B^2$, where F is the magnetic force between two magnetic surfaces, and B is the magnetic flux at the surfaces which increases exponentially as magnets are moved closer to each other. As previously described, the first and second rows of magnets 208a and 208b may be moved much closer to each other than the first and second arrays of magnets 202a and 202b. Therefore, the volume of the magnets of the first and second rows of magnets 208a and 208b may be much smaller than the magnets of the first and second magnet arrays 208a and 208b to generate comparable or equal opposing magnetic forces to the forces generated by the first and second magnet arrays 202a and 202b. The uniformity of magnetic field of the magnets of the first and second rows of magnets 208a and 208b may also be to a lower standard than the uniformity of the fields and poles of the first and second magnet arrays 202a and 202b. Due to the lower volume and less strict uniformity requirements, the magnets employed in the first and second rows of magnets 208a and 208b are much more inexpensive (by a factor of 50) and may include readily available magnets such as any commercial off the shelf magnet. Generic rare-earth magnets used on refrigerators or metallic white boards may be strong enough to generate the compensation magnetic forces required for the described operation. For example, the magnets employed in the first and second rows of magnets 208a and 208b of the compensator unit 208 may include common NdFeB magnets, or another type of magnet including SmCo or another rare earth magnet.

As previously described, the APU design inherently causes magnetic forces in the vertical and horizontal directions during translation of the first magnet array 202a, and at configurations between the in- and out-of-phase configurations. To properly provide corresponding magnetic force compensation, the first row of magnets 208a is translated along with the translation of the first magnet array 202a to couple the position of the first row of magnets 208a with the first magnet array 202a. In examples, the first row of magnets 208a is mechanically coupled to the first magnet array 202a and an actuator may move both the first row of magnets 208a and the first magnet array 202a longitudinally along axis B such that the position of the first row of magnets 208a tracks with the position of the first magnet array 202a. The second row of magnets 208b and the second magnet array 202b are mechanically fastened to system support beams 290a and 290c respectively in FIG. 7A. Therefore, the first and second rows of magnets 208a and 208b are maintained in an alignment that provides forces opposing the forces generated by the first and second arrays of magnets 202a and 202b.

FIGS. 5A-5C illustrate the concept described above of controlling the first row of magnets 208a to track with the first magnet array 202a. In FIG. 5A, the vertical magnets of the first and second magnet arrays 202a and 202b are in-phase, while the magnets of the first and second rows of magnets are half-period out-of-phase. The resultant forces generated by the first and second magnet rows 208a and 208b of FIG. 5A have opposite force vectors to those generated by the first and second magnet arrays 202a and 202b. Correspondingly, in the position illustrated in FIG. 5C, the vertical magnets of the first and second magnet arrays 202a and 202b are half-period out-of-phase, while the magnets of the first and second rows of magnets 208a and 208b are in-phase again providing opposite forces and effectively neutralizing the forces experienced by each of the first and second magnet arrays 202a and 202b.

FIG. 5B illustrates a position of the first magnet array 202a and corresponding position of the first row of magnets 208a that are partially (quarter-period) out-of-phase at a same distance along the compensator axis C. It should therefore be understood that in each of the configurations illustrated in FIGS. 5A-5C, the coupling of the position of the first row of magnets 208a with the position of the first magnet array 202a provides dynamic force compensation while the magnetic forces of the whole system is being moved or tuned to provide different radiation energies. While described herein as moving the first magnet array 202a, in examples, an APU may be tuned by translating the second magnet array 202b, and accordingly the second row of magnets 208b may be translated along with the second magnet array 202b to provide force compensation. In examples, the compensator unit 208 may be disposed adjacent to the second magnet array 202b with similar operation as described above.

As previously described with reference to FIGS. 5A-5C, the magnets of the compensator unit 208 have magnetic poles that are positioned along the compensator axis C to negate or neutralize the magnetic forces produced by the first and second magnet arrays 202a and 202b, and reduce or neutralize mechanical stresses provided to mechanical elements of the undulator 200 in the vertical and horizontal directions. As such, the half-period phase shift coupling of the magnetics of the compensator unit 208, as compared to the first and second magnet arrays 202a and 202b, provides a magnetic force in opposition to magnetic forces provided by the first and second magnet arrays 202a and 202b. The generated forces by the compensator unit 208 have opposite force vectors along each of the vertical and horizontal directions as compared to forces generated by the first and second magnet arrays 202a and 202b resulting in a net magnetic force of the system to be neutralized to reduce mechanical stresses on components of the system. As described herein, the magnetic force generated by the first and second magnet arrays 202a and 202b may vary several metric tons as the position of the first magnet array 202a is translated. The compensator unit 208 may provide a magnetic force in opposition to the magnetic forces provided by the first and second magnet arrays 202a and 202b that results in a net magnetic force of the system be neutralized between the first and second magnet arrays 202a and 202b of less than 5 Newtons, less than 10 Newtons, or less than 20 Newtons. The compensator unit 208 may provide a magnetic force that results in a net magnetic force on the system of less than 30%, less than 20%, less than 10% or less than 5% or the overall magnetic force between the first and second magnet arrays 202a and 202b. As used herein, the term "neutralized" refers to a reduction of overall net magnetic force below a limit. The limit of the magnetic force being a force at which mechanical deformations impeded the functionality of the undulator. Therefore, neutralizing the net magnetic forces on the system reduces the overall net mechanical stresses below the limit of impeding functionality. Systems may be able to endure large static magnetic forces, but may deform or malfunction with large variation in magnetic forces during operation of an APU. Therefore, neutralizing the forces should be understood, for a system, to include reducing the overall range of net magnetic forces on a system during operation of an APU. Therefore it may be desirable to neutralize the overall range of force variations or dynamic forces, or reduce the range of forces experienced by elements of the system. As such, the compensation unit 208 may provide a magnetic force that results in a range net magnetic force variation produced by the first and second magnet arrays of between 10 Newtons and 20 Newtons, 15 Newtons and 30 Newtons, of 5 Newtons and 15 Newtons, or in a total range of less than 50 Newtons across the entire phase shift of the first magnet array 202a.

Figure 6A:
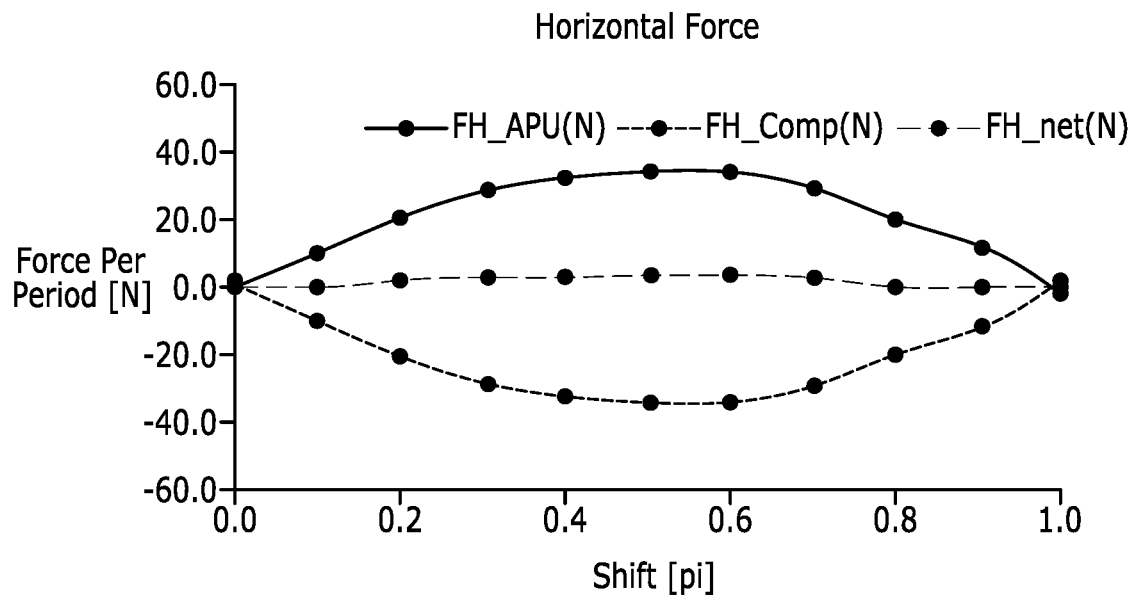
FIG. 6A is a plot of magnetic forces in a longitudinal direction per period versus periodic distance shift of an APU magnet array with a compensation unit.
Figure 6B:
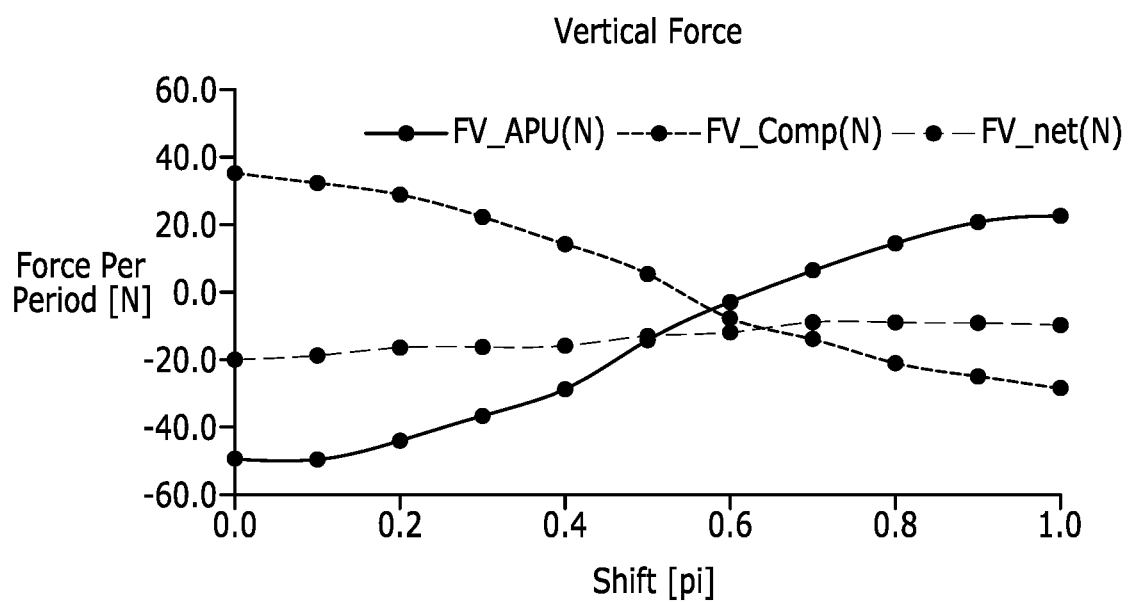
FIG. 6B is a plot of magnetic forces in a transverse direction per period versus periodic distance shift of an APU magnet array with a compensation unit.

FIGS. 6A and 6B are plots of magnetic forces in respective longitudinal (along the propagation axis B of FIGS. 2A and 2B) and vertical directions per period versus phase shift of the first magnet array 202a and first row of magnets 208a. The phase shift is measured in fractions of half-period (i.e., one π, with one period being 2π). The total phase shift of the first magnet array 202a and first row of magnets 208a reported in FIGS. 6A and 6B is half of a period (i.e., the distance to traverse from a completely in-phase position, to a completely out-of-phase position). The data of FIGS. 6A and 6B is reported for a three meter long APU having a 10.5 mm period with a gap of 3.0 mm. Each of the plots presents the force generated by the first and second magnet arrays 202a and 202b of the APU 200 as $F_H$_APU and $F_V$_APU, the compensation forces as $F_H$_Comp and $F_V$_Comp, and the overall net magnetic forces as $F_H$_net and $F_V$_net for respective horizontal and vertical directions. FIG. 6A shows that the compensation forces result in a net force of close to zero across the entire phase shift of the undulator. For example, the net forces shown in the data of FIG. 6A vary by less than 10 Newtons, and more so, less than 5 Newtons across the full range of phases of the first magnet array 202a. FIG. 6B shows that in the vertical direction, the overall net force remains stable around 16 Newtons per period. The non-zero net force is due to the hybrid structure (i.e., use of different types of magnets) of the undulator and pure permanent magnet structure of the force compensate magnet structure. The vertical magnetic force generated by the undulator varied over 70 Newtons, between −50 Newtons and 20 Newtons. In examples, the variation of net force in the vertical direction may be less than 200 Newtons, less than 100 Newtons, less than 50 Newtons, Less than 20 Newtons, or less than an overall force limit to prevent mechanical deformation and malfunction of the undulator. Therefore, even though the vertical forces were not neutralized to zero, the reduced magnetic force will not distort the structure while shifting the phase of the undulator during operation. The vertical forces could be further neutralized by selecting different magnet structures and materials, and using a different compensator gap 260 distance that is specifically designed to neutralize vertical magnetic forces, as well as the longitudinal forces, for a given undulator device. Since there are no adjustable components in the vertical direction, the system can tolerate much larger forces in the vertical direction with the fixed gap configuration of the APU. Moreover, the dynamic force in the vertical direction (i.e., vertical force variations) has been significantly reduced, which reduces the stresses and potential deformations of the system structure allowing for proper APU operations at higher brightness and with longer magnet arrays.

Figure 7A:
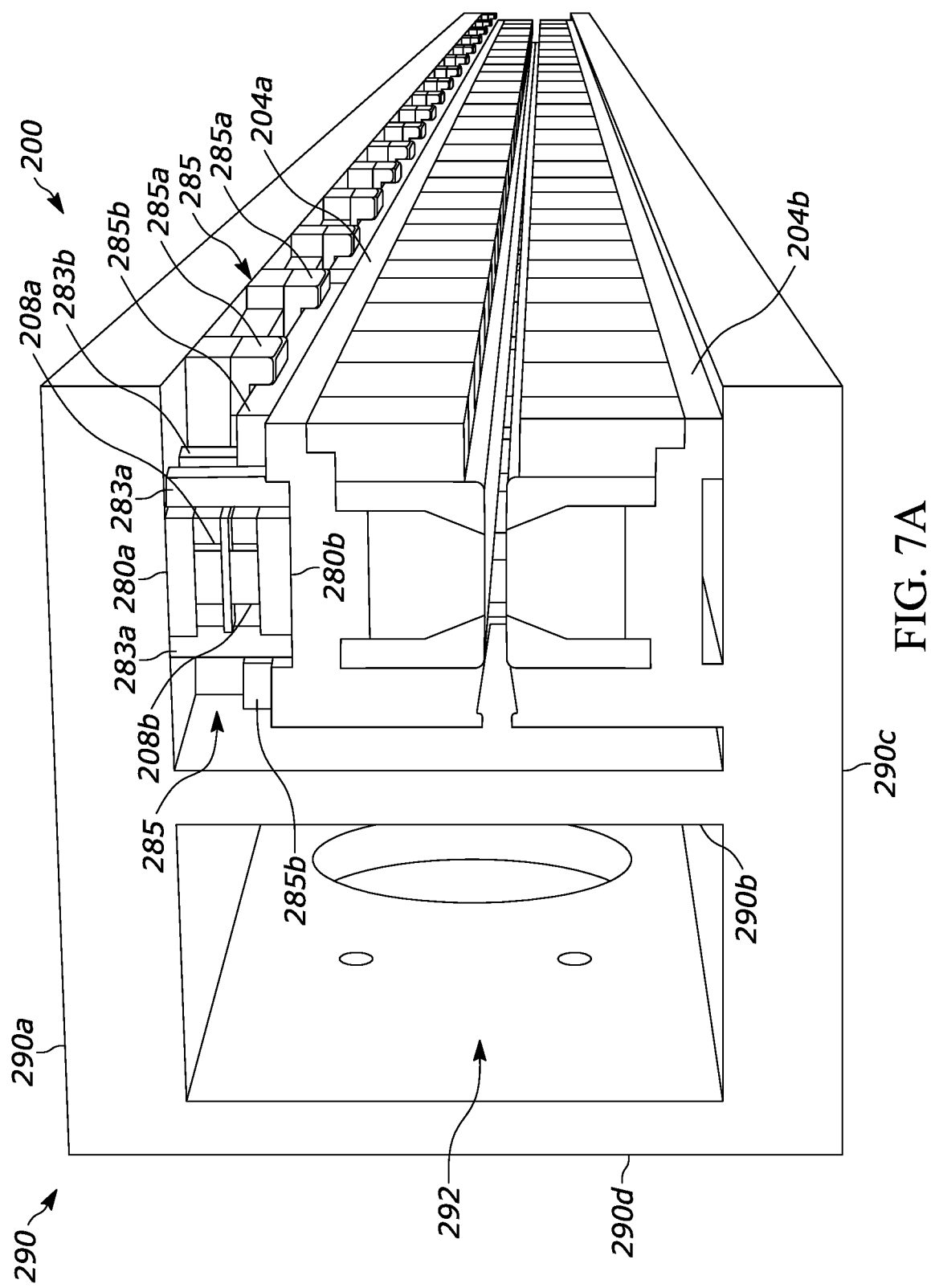
FIG. 7A is a perspective view or a force neutralized undulator having a compensation unit.
Figure 7B:
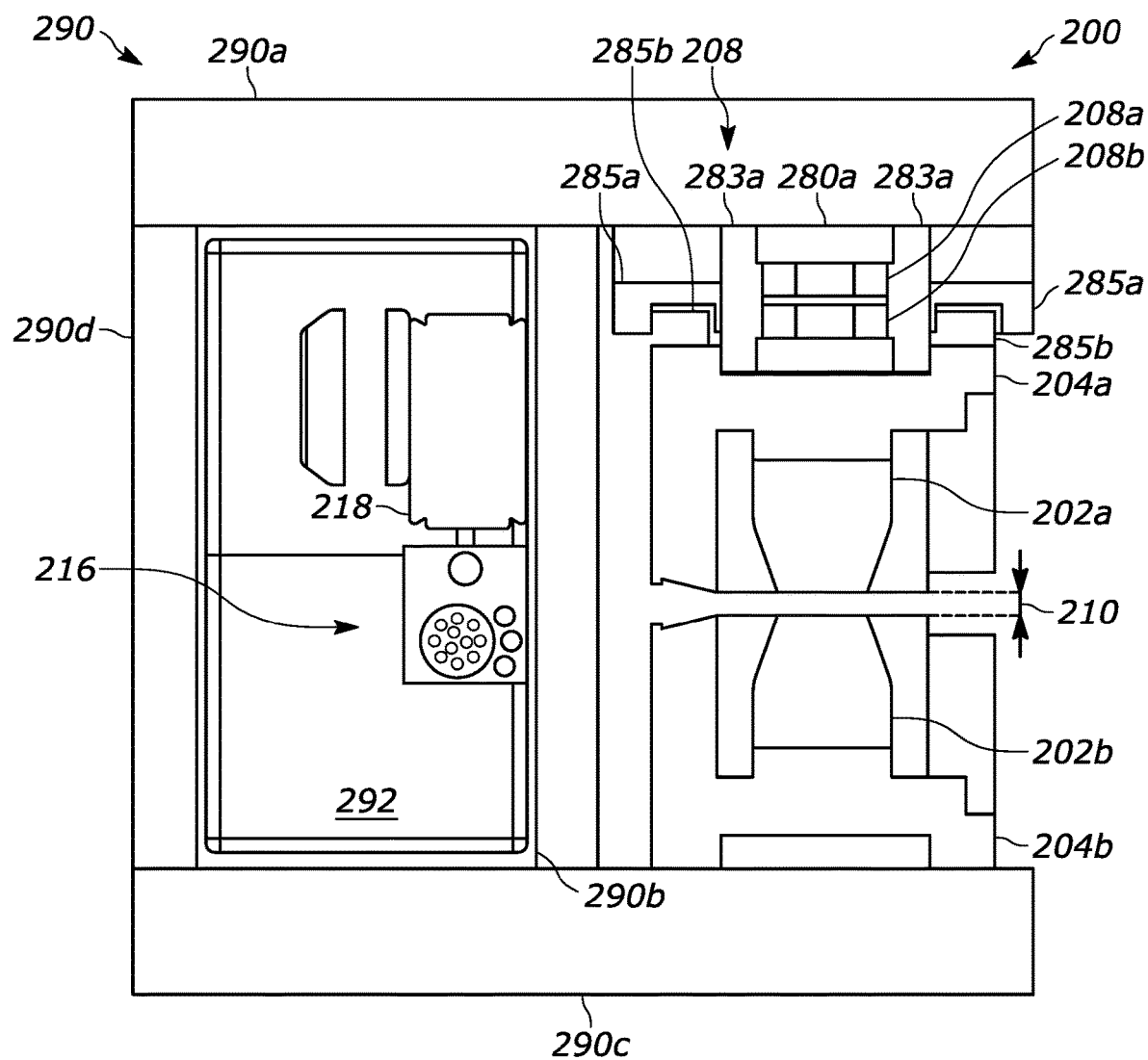
FIG. 7B is an end-view of an undulator having a compensation unit.

FIGS. 7A and 7B are respectively perspective and side-views of an embodiment of a force neutralized undulator 200 having a compensation unit 208. The undulator presented in FIGS. 7A and 7B was fabricated resulting in a three meter long undulator with a 10.5 mm magnetic period, at a 3 mm fixed gap between the first and second magnet arrays 202a and 202b. In embodiments, the force neutralized undulator 200 may have lengths on the order of meters, for example, lengths of 2 m, 3 m, 5 m, or longer than 5 m. Additionally, the gap between the first and second magnet arrays 202a and 202b may be 2 mm, 3 mm, 5 mm, 7 mm, 10 mm, 20 mm, less than 50 mm, greater than 20 mm, or greater than 50 mm. The period of the undulator may be on the order of tens of mm, for example, between 5 and 15 mm, between 10 and 20 mm, between 15 and 30 mm, less than 50 mm or longer than 50 mm. The undulator 200 includes first and second magnet arrays 202a and 202b separated by the gap 210. Each of the first and second magnet arrays 202a and 202b is physically coupled to respective first and second magnet keepers 204a and 204b. Each of the keepers 204a and 204b supports and maintains each respective magnet array 202a and 202b in position. Linear slides 285 are coupled to the first keeper 204a and to a support beam 290a, discussed further below. The linear slides 285 may move the first keeper 204a along the central axis illustrated in FIG. 2 to tune the phase of the undulator 200 to tune the energy of generated radiation.

The undulator 200 further includes a support frame 290 including first, second, third, and fourth support beams 290a-d. The linear slides 285 include a carriage 285a and a rail 285b. The carriage 285a of the linear slide 285 is physically coupled to the first support beam 290a. The rail 285b of the linear slide 285 is physically coupled to the first keeper 204a of the first magnet array 202a. The first row of magnets 208a of the compensation unit 208 is physically coupled to a first magnet row support 280a. The first magnet row support 280a is physically coupled to the first keeper 204a via the first mounting beams 203a. The rail 285a of the linear slides 285 translates both the first row of magnets 208a and the first magnet array 202a simultaneously. It should be appreciated that the keepers 204a and 204b and support frame 290 provide enough mechanical support without bulky beam structures as required by uncompensated systems. Typical support beams are large and extremely heavy structures that are used to provide mechanical support to the magnet arrays of an undulator. Due to the reduced forces, any associated support beam described herein could be reduced in size and weight while still providing adequate mechanical support for undulator operation. As such, we describe the support structures as keepers and a support frame instead of the traditional large, expensive, and extremely heavy strongbacks of AGU undulator systems.

The second row of magnets 208b is physically coupled to a second magnet row support 280b. The second magnet row support 280b is further physically coupled to the second mount beams 203b that is physically coupled to the first support beam 290a. The mounting beams 203a and 203b are interlaced and periodically distributed along the longitudinal direction C. The distance between the mounting beams 203a and 203b along the longitudinal direction C is larger than half period of the undulator, that allows the first magnet array 202a to be translated in the longitudinal direction C up to half period distance during operation. The second mount beams 203b and the second magnet row support 280b provide structural support to the second row of magnets 208b to maintain a position of the second row of magnets 208b relative to the first row of magnets 208a when the first row of magnets 208a is stationary or being translated.

The second keeper 204b is physically coupled to the third support beam 290c, and the third support beam 290c supports and maintains a position of the second keeper 204b and the second magnet array 202b. In the current example, the second magnet array 202b is not translatable, but it should be understood that in embodiments, the second keeper 204b and the second magnet array 202b may be translatable.

The support frame 290 includes a hollow 292 having one or more encoders 218 and actuators 216 inside. For simplicity and clarity, a single encoder 218 and actuator 216 are illustrated, but multiple encoders 218 may be disposed along the length (i.e., in the dimension of the central axis B or compensator axis C as illustrated in FIGS. 5A-5C) of the undulator 200. It should be noted that the disclosed force neutral undulator allows for the use of a single compact actuator 216 for controlling the position of the first magnet array 202a. A single compact actuator 216 may be used due to the neutralization of magnetic forces on the first and second magnet arrays 202a and 202b, whereas other systems, without force neutralization, require much larger heavy-duty actuator 216 due to the increased magnetic forces and mechanical stresses of such systems.

The encoder 218 is disposed along the second beam 290b with the encoder 218 configured to measure the position, and translation distances, of the first magnet array 202a and first row of magnets 208a. To measure the position and translation of the first magnet array 202a the encoder 218 is coupled to the first magnet array 202a and/or first keeper 204a. The encoder 218 may be a mechanical encoder, optical encoder, magnetic encoder, or electromagnetic encoder that is respectively mechanically coupled, optically coupled, magnetically coupled, or electromagnetically coupled to the first magnet array 202a, or another part that moves along with the first magnet array (e.g., first keeper 204a, first row of magnets 208a, etc.). The encoder 218 provides a signal indicative of the position, or a traversed translation distance, to a processor or other device for monitoring and/or controlling the position, translation distance, and/or translation speed of the first magnet array 202a and first row of magnets 208a. The actuator 216 is coupled to the first magnet row support 280a and the first keeper 204a, with the actuator configured to translate each of the first magnet array 202a and the first row of magnets 208a. The actuator 216 may be a motor, rotary actuator, electrical actuator, pneumatic actuator, electric actuator, mechanical actuator that is mechanically, electrically, thermally, or otherwise coupled to the first magnet array 202a, or coupled to other components for controlling the position of the first magnet array 202a. A processor or other device may provide a signal to the actuator 216 to control the position, a translation distance amount, and/or a translation speed of the first magnet array 202a and first row of magnets 208a. In examples, the encoder 218 may provide a signal directly to the actuator 216, and together, the encoder 218 and actuator 216 may monitor and control a position, translation distance, and translation speed of the first magnet array 202a and first row of magnets 208a.

Figure 8:
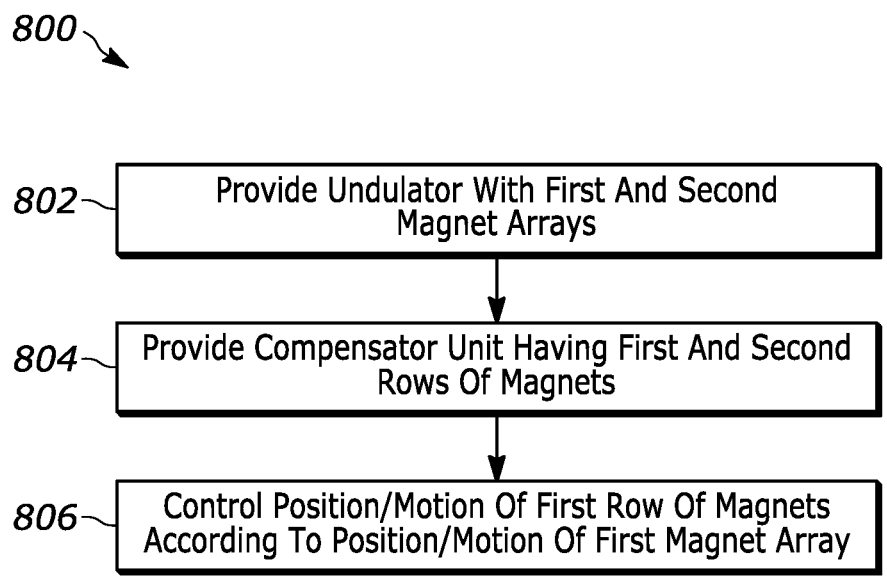
FIG. 8 is a flow diagram of a method for performing force compensation for an undulator device.

FIG. 8 is a flow diagram of a method 800 for performing force compensation for an undulator device. The method may be performed using the undulator devices described herein, and therefore, the method 800 of FIG. 8 will be described with reference to elements of FIGS. 2, 7A, and 7B. The method 800 includes providing an undulator having the first and second magnet arrays 202a and 202b (block 802). The first and second magnet arrays 202a and 202b are disposed along the central axis B along which a beam of charged particles may propagate. The second magnet array 202b is on an opposite side of the central axis B from the first magnet array 202a and at a distance across the gap 210 from the first magnet array 202a. The first magnet array 202a is translatable along the central axis B.

The method 800 further includes providing the compensator unit 208 adjacent to the first magnet array 202a (block 804). The compensator unit includes the first row of magnets 208a disposed along the compensator axis 260, and a second row of magnets 208b disposed along the compensator axis 260 on an opposite side of the compensator axis 260. The first row of magnets 208a axis translatable along the compensator axis C.

The first row of magnets 208a is physically coupled to the first array of magnets 202a (block 806). Therefore, as the one or more actuators 218 control the position of the first array of magnets 202a, the first row of magnets 208a translate along with the first array of magnets 202a (block 808). The actuator 218 may receive a signal from a processor, the encoder 216, or another device that instructs the actuator 218 how to position or move the first row of magnets 208a and the first magnet array 202a. In examples, the actuator 208a controls the position and/or motion of the first row of magnets 208a to track with the position and/or motion of the first magnet array 202a. In some examples, the one or more actuators 218 is a single actuator.

Figure 9A:
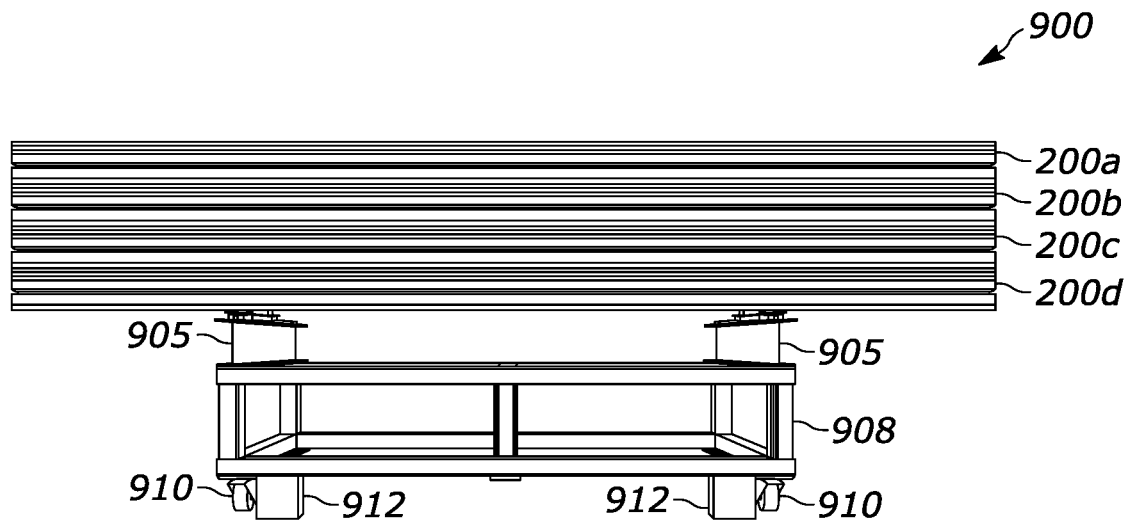
FIG. 9A is a side-view of an array of multiplexed force neutralized undulator devices.
Figure 9B:
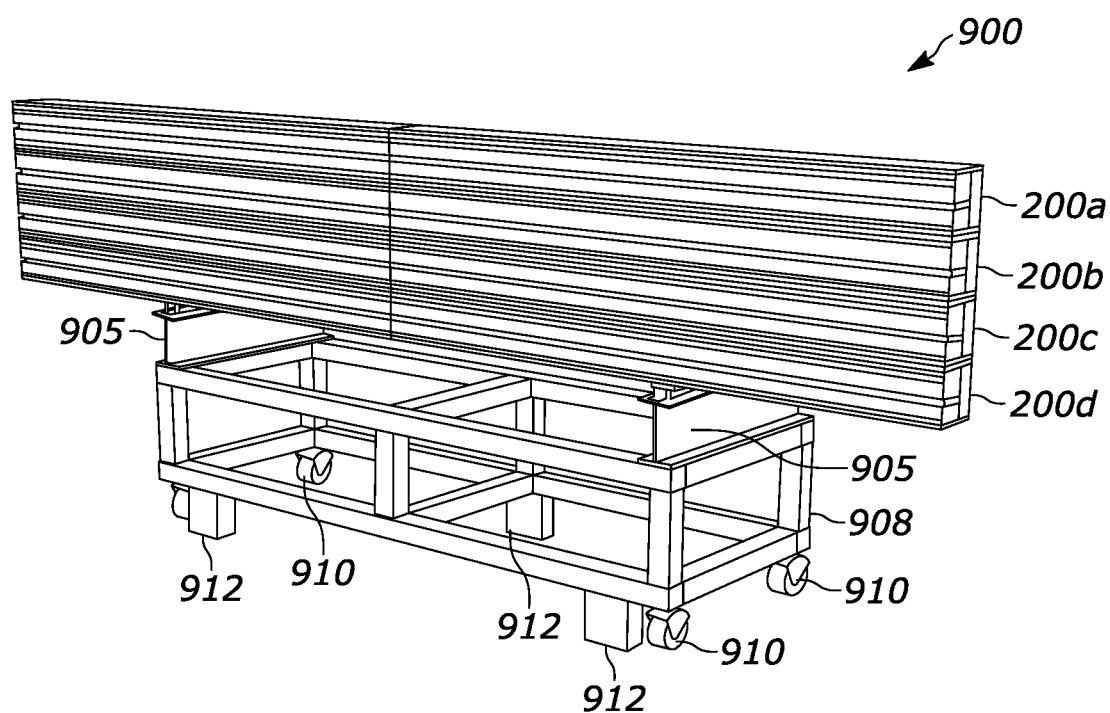
FIG. 9B is a perspective view of an array of multiplexed force neutralized undulator devices.

As previously described, neutralizing the magnetic forces exerted on the first and second magnet arrays 202a and 202b allows for less bulky support structures and simplified mechanical design to generate x-ray radiation and maintain a gap profile within a 10 micron tolerance. The overall volume of the described force neutralized APU is a factor of 10 to 20 times smaller than other AGUs of comparable lengths. Additionally, the disclosed force neutralized APU has a weight that is five to eight times less than other similar length undulator devices. As such, the simplified support structures, as illustrated in FIGS. 7A and 7B, allow for the integration of multiple force-neutralized undulator devices for fabricating a multiplexed undulator array. FIGS. 9A and 9B depict respective side and perspective views of an array 900 of multiplexed force neutralized undulator devices 200a-200d. The array 900 includes four undulators 200a-200d that are stacked vertically with each undulator 200a-200d physically coupled to one or more corresponding neighboring adjacent undulators. A bottom undulator 200d of the array 900 is physically mounted on two support beams 905. The support beams 905 are further mounted on a rigid movable mount frame 908. The frame 908 includes wheels 910 that enable the frame 908 to be translated on a floor to adjust the spatial positioning of the array 900 of undulators 200a-200d. Support anchors 912 are used to support the frame 208 in a specific position and to prevent the frame 908 from moving.

During operation, the array 900 may be positioned such that a beam of charged particles passes through one of the undulators 200a-200d. In examples, each of the undulators 200a-200d may have different magnetic properties to generate radiation having different respective properties. For example, each of the undulators 200a-200d may have different properties including one or more of a different magnet period, magnet strength, gap distance between magnets, length of magnets, and undulator phase configuration. One or more actuators or position motors (not illustrated) may be coupled to the beams 905 between the beams 905 and the undulator array 900, or between the beams 905 and the frame 208. The position motors may change a horizontal position or a vertical position of the undulator array 900 to move the undulator array 900 horizontally away from the charged particle beam vacuum chamber that is not depicted, and then translate vertically to position one of the undulators 200a-200d and then horizontally again to move back the array with another undulator of the array 200a-200d for a beam of charged particles to pass through. The position of the array 900 may then be changed to align another of the undulators 200a-200d with the beam to generate radiation having different properties. Therefore, the multiplexed undulator array 900 provides a convenient way to change generated radiation by tuning of the position of the undulator array 900 to align the beam with different undulators 200a-200d. In prior art systems, an entirely different undulator must be mounted and aligned in bulky heavy support structures to change the physical, magnetic, and electric properties of an undulator system. Additionally, while four undulators 200a-200d are depicted in the array 900, the examples depicted in FIGS. 9A and 9B should not be considered so limited.

Figure 9C:
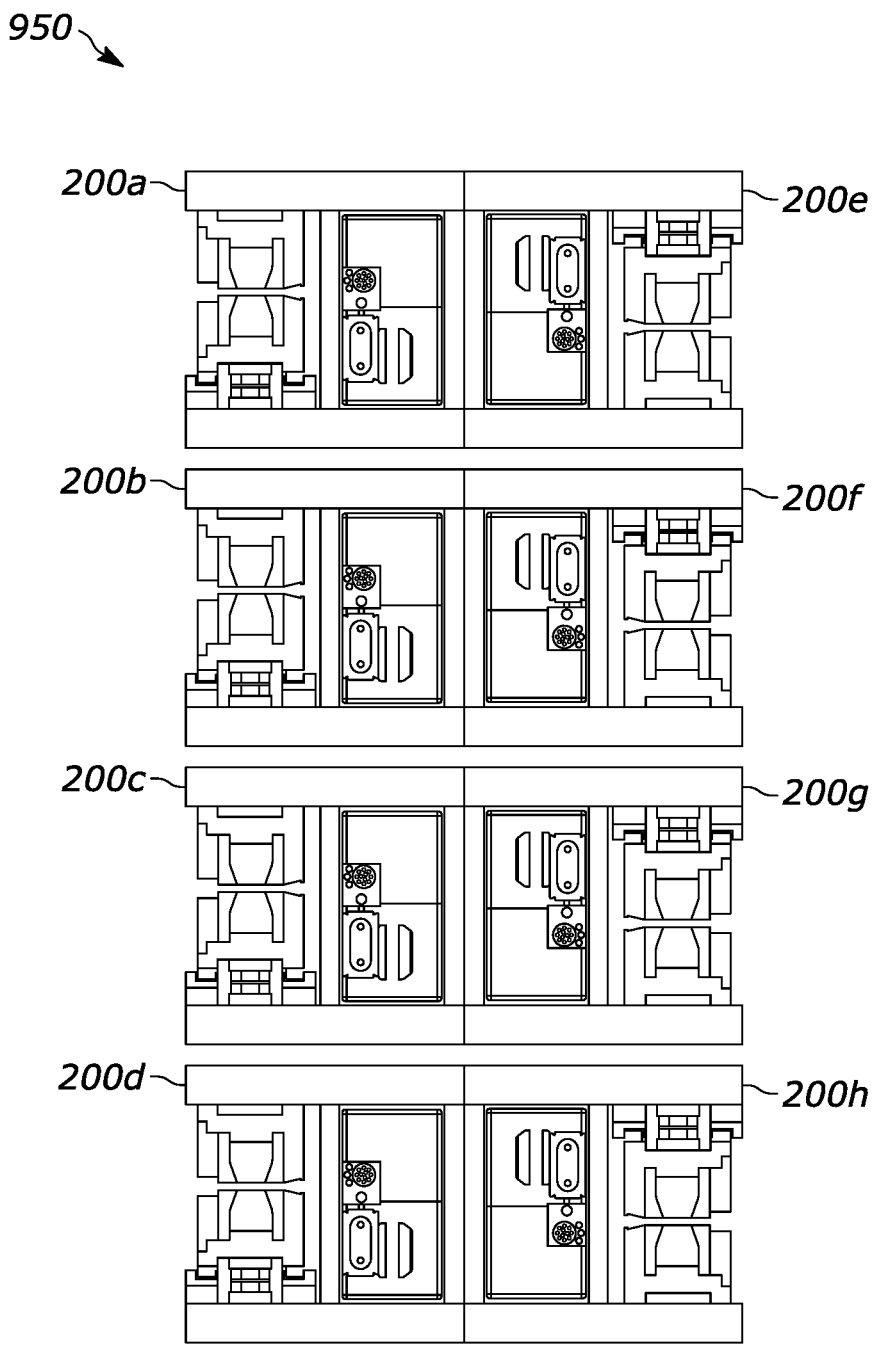
FIG. 9C is a front-view of an array of multiplexed force neutralized undulator devices.

FIG. 9C is an end view of an array 950 of multiplexed force neutralized undulator devices 200a-200h. While the array of FIGS. 9A and 9B illustrated an array 900 having four undulators 200a-200d, the array 950 of FIG. 9C provides an arrangement of eight undulators 200a-200h that may be similarly mounted on beams 905 as illustrated in FIGS. 9A and 9B. The position of the array 950 may be translated to align a charged particle beam with any of the eight undulators 200a-200h to generate high-energy radiation having different properties based on the various geometries of each undulator 200a-200h (i.e., magnetic period, gap distance, magnet strength, undulator length, polarization orientations, etc.).

Figure 10A:
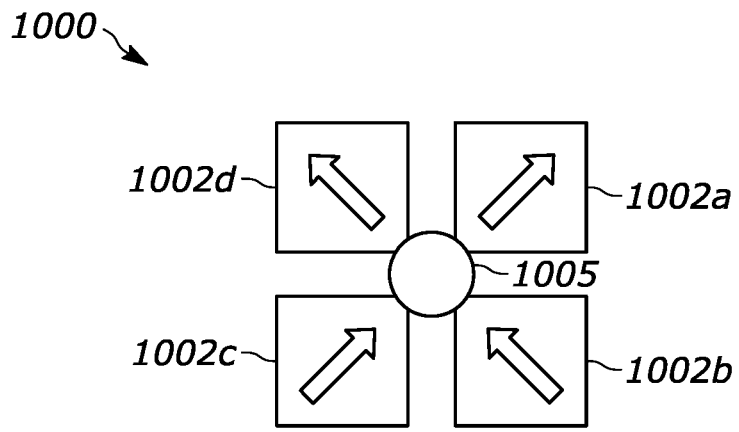
FIG. 10A is a front-view of a configuration of magnetic fields produced by magnet arrays of an X-undulator.
Figures 10B, 10C:
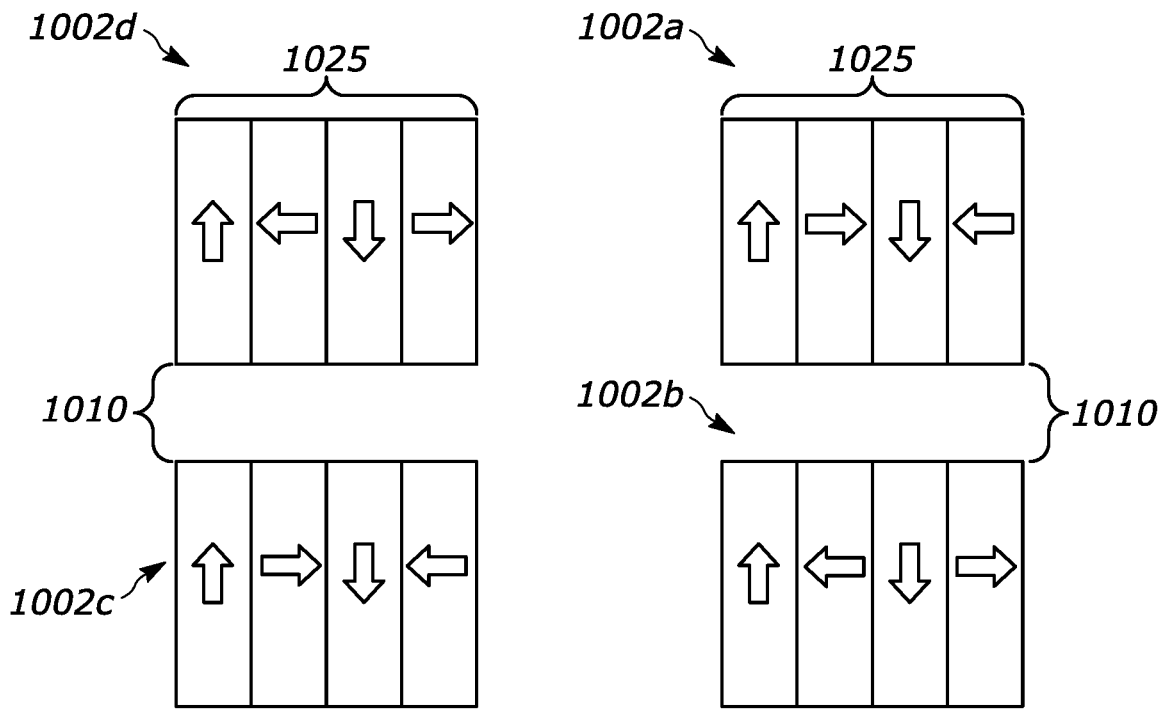
FIG. 10B is a side-view cross-section of a first set of two magnet arrays of an X-undulator.
FIG. 10C is a side-view cross-section of a second set of two magnet arrays of an X-undulator.

The disclosed systems and methods for a force-neutral undulator can also be applied to an X-undulator. FIG. 10A is cross-section view of a configuration of magnets producing magnetic fields in an X-undulator 1000. A magnetic moment of each of the magnets is indicated by a diagonal arrow on each of the first, second, third, and fourth magnet arrays 1002a, 1002b, 1002c, and 1002d. Each of the magnet arrays 1002a-1002d includes a plurality of magnets extending into the plane of the page with each magnet having a different polarization to generate the diagonal magnetic fields. FIG. 10B is a side-view of the third and fourth magnet arrays 1002c and 1002d separated by a gap 1010, and FIG. 100 is a side-view cross-section of the first and second magnet arrays 1002a and 1002b separated by the gap 1010. Each of the magnet arrays includes a period 1025 which includes four magnets each having different polarizations. The combinations of vertical and horizontal magnet poles create the diagonal magnetic field shown in FIG. 10A.

The X-undulator 1000 includes a chamber 1005 disposed between the four magnet arrays 1002a-1002d, through which a beam of charged particles may propagate. The chamber 1005 is centered on a central axis that extends into the page as illustrated in FIG. 10A. The magnet arrays 1002a-1002d may be independently translated to position the magnet arrays relative to each other to provide different magnitudes and orientations of magnetic fields to charged particles propagating through the chamber 1005. One or more Hall effect sensors may be disposed at the position of a path of propagation of a charged particle beam before the chamber 1005 is installed, to measure the magnetic field that would be experienced by the beam. Scanning of a plurality of Hall effect sensors disposed inside the chamber 1005 may be useful for mapping of the magnetic field along the undulator 1000 and tuning the magnetic properties of the X-undulator.

FIGS. 10B and 10C illustrate the magnet arrays 1002a-1002d at positions with the magnet arrays 1002a-1002d being in-phase. By shifting the magnet arrays relative to each other, the X-undulator 1000 can be configured to generate any polarizations of radiation including vertical linear, horizontal linear, diagonal linear, right circular, left circular, or elliptical polarizations and different energies of radiation at specific polarization. FIG. 11 is a table presenting different position configurations of the four magnet arrays 1002a-1002d that generate different polarizations of radiation at different energies. The positions are reported in fractions of π, which is half of the period 1025 of the X-undulator 1000. For the example provided in FIG. 11, the second magnet array 1002b is kept in a same position while each of the other magnet arrays 1002a, 1002c, and 1002d are each shifted in position. The first column of FIG. 11 reports the polarization of the generated radiation for an undulator with the various magnet arrays (i.e., jaws) at various phase positions in terms of π. The rows report the vertical, right circular, horizontal, and left circular polarizations for various polarization phases at the corresponding jaw phase locations. Moving the first and third magnet arrays 1002a and 1002c tunes the polarization of the radiation, while changing the position of the second and fourth magnet arrays 1002b and 1002d tunes the energy of the generated radiation at that specific polarization.

Figure 12:
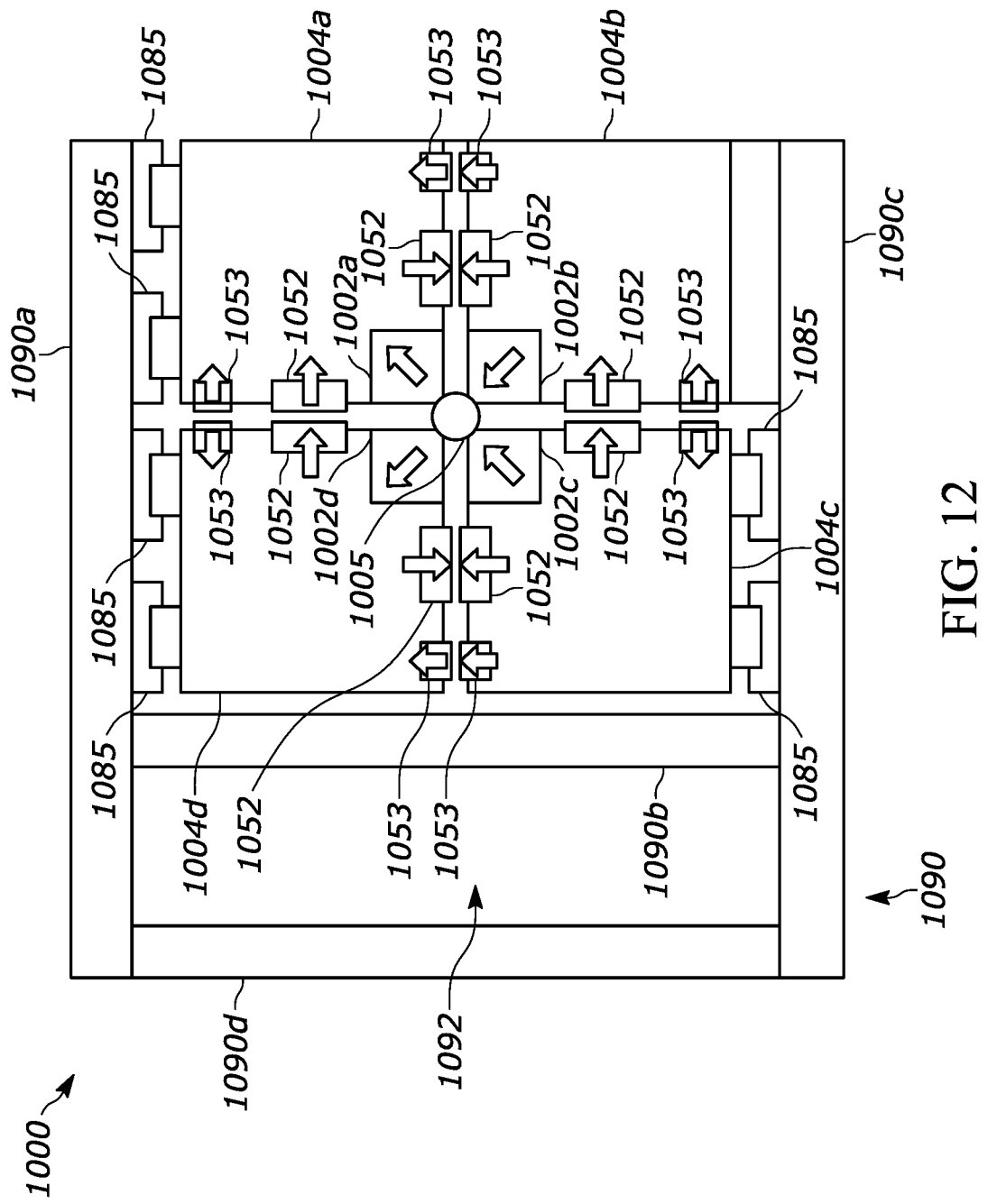
FIG. 12 is a force and torque neutralized, phase adjustable, X-undulator.

FIG. 12 is a force neutralized, phase adjustable, X-undulator 1000. The undulator 1000 includes the four magnet arrays 1002a-1002d as previously described. Each of the magnet arrays 1002a-1002d is disposed along a central axis along which charged particles may propagate, as described with reference to the undulator 200 of FIG. 2A. Each of the magnet arrays 1002a-1002d is disposed in a respective quadrant around the central axis, as illustrated in FIGS. 10A and 12. Additionally, each of the magnet arrays 1002a-1002d is disposed at a gap distance away from a neighboring magnet array in an adjacent quadrant. The force-neutralized X-undulator 1000 provides neutralization for both magnetic forces and torques to the system. In the current example, each of the first, third, and fourth magnet arrays 1002a, 1002c, and 1002d is physically coupled to linear sliders 1085, and an actuator may translate the magnet arrays along the sliders 1085 to tune the phase of the magnet arrays. As illustrated, the second magnet array 1002b is physically mounted to a support beam 1090c of a frame 1090. The frame 1090 includes four support beams 1090a-1090c to house and support the positions of electrical, magnetic, and mechanical elements of the undulator 1000. The frame 1090 includes a hollow 1092 that may house electronics, actuators, encoders, or other devices for operating the X-undulator 1000.

Each of the magnet arrays 1002a-1002d is physically coupled to a respective keeper 1004a-1004d. Each keeper 1004a-1004d supports the position of a respective magnet array 1002a-1002d along the central axis, and the keepers 1004a-1004d are physically coupled to the sliders 1085 such that the keepers 1004a-1004d may be translated by the sliders 1085 along the central axis. Each of the keepers 1004a-1004d also includes compensator magnets mounted on teach keeper of a corresponding magnet array 1002a-1002b. Each of the compensator magnets is disposed across a gap from compensator magnets of an adjacent group of compensator magnets to neutralize magnetic forces and torque provided to the keepers. The compensator magnets include first and second sets of magnet pairs 1052 and 1052 coupled between each of the keepers 1004a-1004d to neutralize the magnet forces supplied to each of the keepers 1004a-1004d. For example, a first set of magnet pairs 1052 coupling the first and second keepers 1004a-1004b has magnets with opposing vertical polarizations.

Due to the X-undulator generating forces in three dimensions, second magnet pairs 1053 are required between each of the keepers 1004a-1004d to further neutralize parasitic magnetic forces on the keepers 1004a-1004d. For example, the first and second keepers 1004a and 1004b are coupled by a second magnet pair 1053 with magnets having same vertical polarizations to neutralize torque forces between the first and second magnet arrays 1002a and 1002b. As previously described, and as illustrated in FIG. 12, the magnets of the first and second magnet pairs 1052 and 1053 may be disposed on opposing edges of adjacent keepers, closer together than the magnets of the magnet arrays 1002a-1002d. Therefore, the magnets of the first and second magnet pairs 1052 and 1053 may be weaker in magnetic field strength than the magnet arrays 1002a-1002d while still compensating for, and neutralizing, magnetic forces experienced by the keepers 1004a-1004d.

Figure 13:
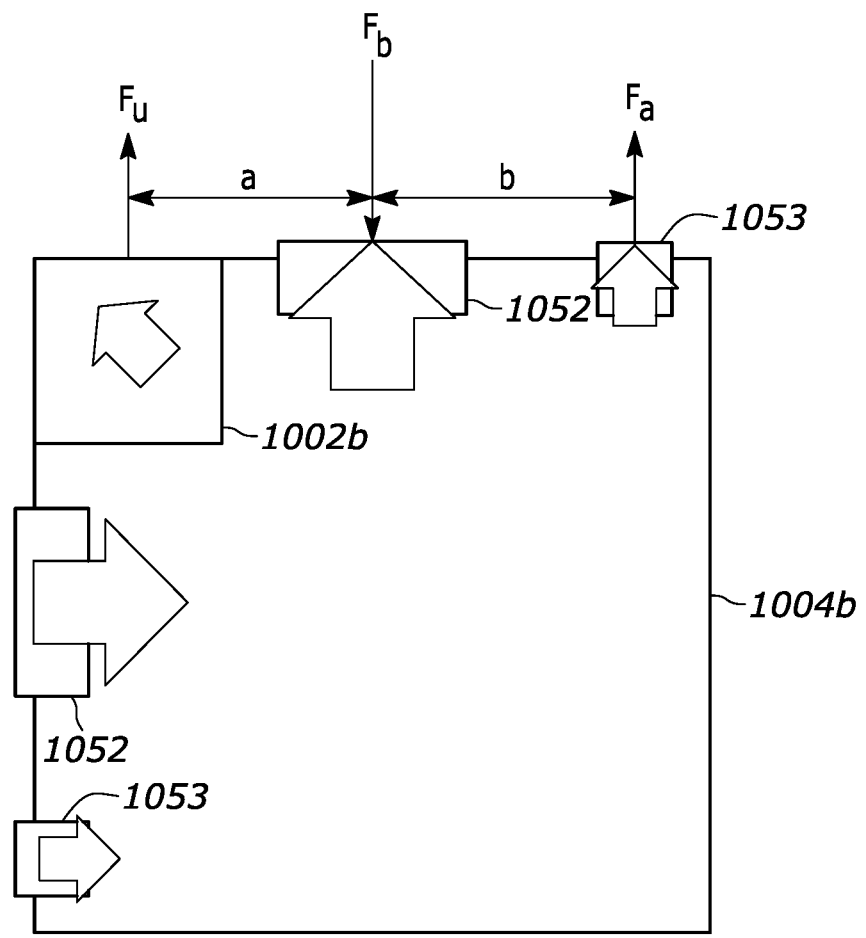
FIG. 13 is a cross-section view of one of the four magnet arrays of the force and torque neutralized, phase adjustable, X-undulator.

FIG. 13 is an example force diagram of the second magnet array 1002b of the force neutralized X-undulator 1000. The neutralization of forces on the second magnet array 2002 may be described by $$F_u + F_b + F_a = 0,\qquad \text{EQ. 1}$$

with $F_u$ being the force exerted on the second magnet 1002b, and $F_a$ and $F_b$ being vertical force exerted on the second keepers 1004b. Additionally, neutralizing the torque of the system may be described by $$F_u \times a = F_a \times b,\qquad \text{EQ. 2}$$

with the left side representing torque on the second magnet 1002b at a distance "a" from a center point of the second keepers 1004b, and the right side of EQ. 2 representing the torque on the magnet 1053 and right side of the second keepers 1004b. Balancing of EQs. 1 and 2 allows for the fabrication of force neutralized X-undulator devices according to FIGS. 12 and 13. It should be understood that while not shown, the same balancing of forces is applied to the magnets on the left side of the second magnet array 1002b, and the second keepers 1004b. Additionally, balancing of the forces and torques, as shown in EQS. 1 and 2, is applied to each set of magnets for each of the magnet arrays 1002a-1002d to fabricate the force neutralized X-undulator 1000. As such, each of the compensator magnets is disposed across a gap from compensator magnets of an adjacent keeper in an adjacent quadrant, to neutralize the magnet forces in the X-undulator system.

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A force-compensated undulator device including a first magnet array disposed along a central axis of the undulator device, the first magnet array being translatable along the dimension of the central axis; a second magnet array disposed along the central axis, the second magnet array disposed on an opposite side of the central axis from the first magnet array with a gap distance separating the second magnet array from the first magnet array; and a compensator unit disposed adjacent to the first magnet array, the compensator unit including (i) a first row of magnets disposed along a compensator axis, the compensator axis being parallel to the central axis, and (ii) a second row of magnets disposed along the compensator axis on an opposite side of the compensator axis from the first row of magnets, and wherein the first row of magnets is translatable along the dimension of the compensator axis.

2. The undulator device of aspect 1, wherein the first row of magnets is mechanically coupled to the first magnet array and the position of the first row of magnets tracks with the position of the first magnet array.

3. The undulator device of either of aspects 1 or 2, wherein the first magnet array has a magnet period, and wherein the first magnet array is translatable by a distance equal to or greater than half of the magnet period.

4. The undulator device of any of aspects 1 to 3, wherein the compensator unit provides a magnetic force in opposition to a magnetic force provided by the first and second magnet arrays, resulting in neutralization of the longitudinal force of the system.

5. The undulator device of any of aspects 1 to 3, wherein the compensator unit provides magnetic force in opposition to a magnetic force provided by the first and second magnet arrays, resulting in a net constant transverse magnetic force in the range between 10 to 20 Newtons.

6. The undulator device of any of aspects 1 to 5, further comprising a single actuator coupled to the first magnet array, the actuator configured to control the position and movement of the first magnet array.

7. The undulator device of any of aspects 1 to 6, further comprising a single encoder coupled to the first magnet array, the encoder configured to measure a position and translation of the first magnet array.

8. The undulator device of any of aspects 1 to 7, wherein the gap distance is defined according to the specifications of the undulator to be in the range of 2 mm to 10 mm or greater than 10 mm.

9. The undulator device of any of aspects 1 to 8, wherein the gap profile is maintained within less than a 10 micron tolerance.

10. The undulator device of any of aspects 1 to 9, wherein the undulator device is an adjustable phase undulator.

11. A method for performing force compensation of magnetic forces for an undulator, the method including providing an undulator including a first magnet array and a second magnet array, with the first magnet array and second magnet array disposed along a central axis on opposite sides of the central axis, with the second magnet array disposed at a gap distance away from the first magnet array, and wherein the first magnet array is translatable along the dimension of the central axis; providing a compensator unit disposed adjacent to the first magnet array, the compensator unit including (i) a first row of magnets disposed along a compensator axis, the compensator axis being parallel to the central axis, and (ii) a second row of magnets disposed along the compensator axis on an opposite side of the compensator axis from the first row of magnets, wherein the first row of magnets is translatable along the dimension of the compensator axis; monitoring a position of the first array of magnets; and controlling a position of the first row of magnets according to the position of the first array of magnets.

12. The method according to aspect 11, wherein the first row of magnets is mechanically coupled to the first magnet array, and controlling the position of the first row of magnets comprises causing the position of the first row of magnets to track with the position of the first magnet array.

13. The method of either aspect 11 or 12, wherein the first magnet array has a magnet period, and wherein the first magnet array is translatable by a distance equal to or greater than half of the magnet period.

14. The method of any of aspects 11 to 13, wherein the compensator unit provides a magnetic force in opposition to a magnetic force provided by the first and second magnet arrays, resulting in a net magnetic force between the first and second magnet arrays of less than 5 Newtons in a given dimension.

15. The method of any of aspects 11 to 13, wherein the compensator unit provides magnetic force in opposition to a magnetic force provided by the first and second magnet arrays, resulting in a net magnetic force in the range between 10 Newtons and 20 Newtons.

16. The method of any of aspects 11 to 15, wherein the first magnet array is translatable by controlling a position and movement of the first magnet array by a single actuator.

17. The method of any of aspects 11 to 16, wherein the gap distance is maintained within less than a 3 micron tolerance.

18. The method of any of aspects 11 to 17, wherein the undulator is an adjustable phase undulator.

What is claimed is:

1. A force-compensated undulator device comprising:
a first magnet array disposed along a central axis of the undulator device, the first magnet array being translatable along the dimension of the central axis;
a second magnet array disposed along the central axis, the second magnet array disposed on an opposite side of the central axis from the first magnet array with a gap distance separating the second magnet array from the first magnet array;
a compensator unit disposed adjacent to the first magnet array, the compensator unit including (i) a first row of magnets disposed along a compensator axis, the compensator axis being parallel to the central axis, and (ii) a second row of magnets disposed along the compensator axis on an opposite side of the compensator axis from the first row of magnets, and wherein the first row of magnets is translatable along the dimension of the compensator axis.

2. The undulator device of claim 1, wherein the first row of magnets is mechanically coupled to the first magnet array and the position of the first row of magnets tracks with the position of the first magnet array.

3. The undulator device of claim 1, wherein the first magnet array has a magnet period, and wherein the first magnet array is translatable by a distance up to half of the magnet period.

4. The undulator device of claim 1, wherein the compensator unit provides a magnetic force in opposition to a magnetic force provided by the first and second magnet arrays, resulting in a net magnetic force of the system to be neutralized.

5. The undulator device of claim 1, further comprising a single actuator coupled to the first magnet array, the actuator configured to control the position and movement of the first magnet array.

6. The undulator device of claim 1, further comprising a single encoder coupled to the first magnet array, the encoder configured to measure a position and translation of the first magnet array.

7. The undulator device of claim 1, wherein the gap profile is maintained within a 10 micron tolerance.

8. The undulator device of claim 1, wherein the undulator device is an adjustable phase undulator.

9. A multiplexed undulator array comprising a plurality of undulator devices, the plurality of undulator devices including at least one undulator device as recited in claim 1, each undulator device of the plurality of undulator devices having different magnetic characteristics and each undulator device physically coupled to one or more neighboring undulator devices, with at least one of the undulator devices disposed along a beam axis, and wherein each of the plurality of undulators is translatable to be disposed along the beam axis.

* * * * *